US012809534B2

(12) United States Patent
Lee et al.

(10) Patent No.: US 12,809,534 B2
(45) Date of Patent: Nov. 24, 2026

(54) SEMICONDUCTOR MEMORY DEVICE AND MEMORY SYSTEM INCLUDING THE SAME

(71) Applicant: Samsung Electronics Co., Ltd., Suwon-si (KR)

(72) Inventors: Jeon Il Lee, Suwon-si (KR); Jinwoo Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 18/982,194

(22) Filed: Dec. 16, 2024

(65) Prior Publication Data

US 2025/0377813 A1 Dec. 11, 2025

(30) Foreign Application Priority Data

Jun. 5, 2024 (KR) ........................ 10-2024-0073758

(51) Int. Cl.
*G06F 3/06* (2006.01)

(52) U.S. Cl.
CPC .......... *G06F 3/0626* (2013.01); *G06F 3/0629* (2013.01); *G06F 3/0673* (2013.01)

(58) Field of Classification Search
CPC .... G06F 3/0626; G06F 3/0629; G06F 3/0673; G06F 13/1657; G11C 5/025; G11C 8/12; G06N 3/06
USPC .......................................................... 711/154
See application file for complete search history.

(56) References Cited

U.S. PATENT DOCUMENTS

| | | | |
|---|---|---|---|
| 8,089,819 B2 | 1/2012 | Noda et al. | |
| 9,305,616 B2 | 4/2016 | Yu et al. | |
| 10,474,581 B2 | 11/2019 | Willcock et al. | |
| 10,990,524 B2 | 4/2021 | Huang et al. | |
| 11,126,548 B1 | 9/2021 | Yudanov | |
| 11,355,163 B2 | 6/2022 | Han et al. | |
| 11,514,996 B2 | 11/2022 | Sity et al. | |
| 2021/0125657 A1* | 4/2021 | Biswas | G11C 5/04 |
| 2022/0093159 A1* | 3/2022 | Ji | G11C 11/4087 |

* cited by examiner

*Primary Examiner* — Hua J Song
(74) *Attorney, Agent, or Firm* — Fish & Richardson P.C.

(57) ABSTRACT

At least one embodiment of the present disclosure provides a semiconductor memory device including: a substrate; a plurality of banks on the substrate, the plurality of banks including a first memory cell array of a first size and a second memory cell array of a second size, the second size being smaller than the first size; a peripheral circuit disposed between at least two of the plurality of banks; and a processor disposed adjacent to the second memory cell array.

20 Claims, 16 Drawing Sheets

20

SEMICONDUCTOR MEMORY DEVICE AND MEMORY SYSTEM INCLUDING THE SAME

CROSS-REFERENCE TO RELATED APPLICATION

This application claims priority to and the benefit of Korean Patent Application No. 10-2024-0073758 filed in the Korean Intellectual Property Office on Jun. 5, 2024, the entire contents of which are incorporated herein by reference.

BACKGROUND

1. Field

The present disclosure relates to a semiconductor memory device and a memory system including the same.

2. Description of the Related Art

In the von Neumann structure, a memory device and a computation device are separately provided, and the computation device receives data from the memory device and performs the computation. In this structure, when a large amount of computation is required, such as artificial neural network (ANN) computations during an ANN operation, the computation speed may be reduced due to the time required to move data between the memory device and the computation device. Accordingly, a memory device with a processing in memory (PIM) structure that can process at least some computations within the memory device has been proposed in order to improve the efficiency of the von Neumann structure.

SUMMARY

Embodiments provide a semiconductor memory device and a memory system including the same that may improve artificial neural network computation performance while minimizing or reducing an increase in size.

At least one embodiment provides a semiconductor memory device including: a substrate; a plurality of banks on the substrate, the plurality of banks including a first memory cell array of a first size and a second memory cell array of a second size, the second size being smaller than the first size; a peripheral circuit between at least two of the plurality of banks; and a processor adjacent to the second memory cell array.

Another embodiment provides a semiconductor memory device including: a substrate; a plurality of banks on the substrate; a peripheral circuit between the plurality of banks; and a processor adjacent to the peripheral circuit, wherein the plurality of banks include a first memory cell array of a first size and a second memory cell array of a second size, the second size smaller than the first size, and wherein a distance between the second memory cell array and the processor is shorter than that a distance between the first memory cell array and the processor.

Another embodiment provides a memory system including: a semiconductor memory device including a plurality of banks and a processor, the plurality of banks including a first memory cell array of a first size and a second memory cell array of a second size, the second size smaller than the first size, and the processor adjacent to the second memory cell array; and a memory controller configured to control an operation of the semiconductor memory device.

According to the embodiments, it is possible to improve artificial neural network computation performance while minimizing or reducing the increase in the size of the semiconductor memory device.

DETAILED DESCRIPTION

Figure 1:
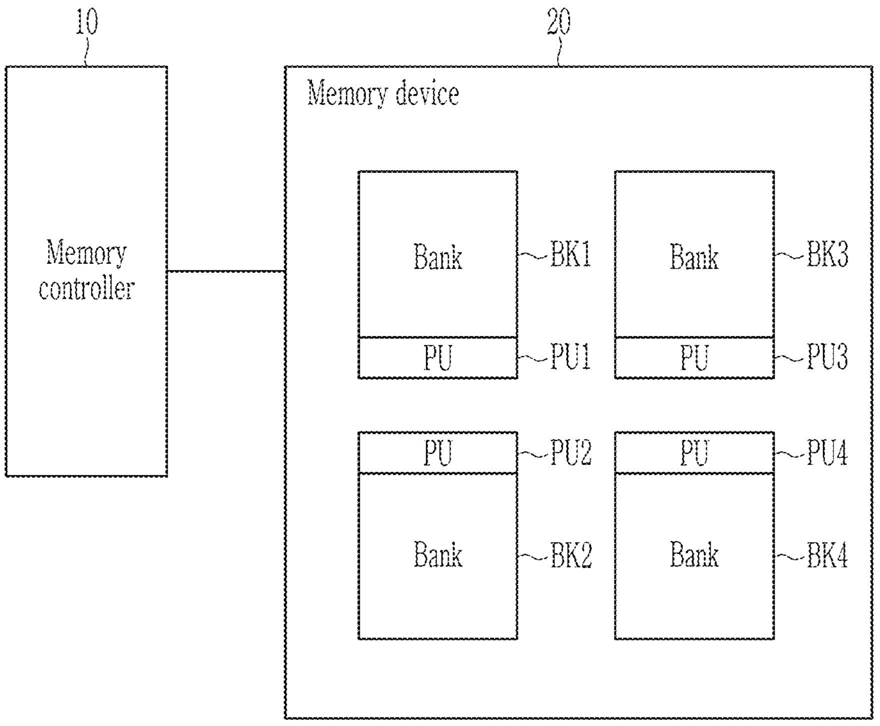
FIG. 1 illustrates a block diagram of a memory system according to at least one embodiment.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

In order to clearly describe the present disclosure, parts or portions that are irrelevant to the description and/or would be repeated are omitted, and identical or similar constituent elements throughout the specification are denoted by the same reference numerals.

Further, in the drawings, the size and thickness of each element are illustrated for ease of description, and the present disclosure is not necessarily limited to those illustrated in the drawings. For example, in the drawings, the thicknesses of layers, films, panels, regions, areas, etc., may be exaggerated for clarity. In other words, in the drawings, for ease of description, the thicknesses of some layers and areas may be exaggerated. It will also be understood that when an element such as a layer, film, region, area, or substrate is referred to as being "on" or "above" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction. It will also be understood that spatially relative terms, such as "above", "top", etc., are intended to encompass different orientations of the device in use or operation in addition to the orientation depicted in the figures, and that the device may be otherwise oriented (rotated 90 degrees or at other orientations) and the spatially relative terms used herein interpreted accordingly.

Further, the terms "unit", "module" or the like related to functional units that process at least one function or operation, may be implemented in and/or include processing circuitry such as hardware, software, and/or a combination of hardware and software. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc., and/or electronic circuits including said components.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Hereinafter, a semiconductor memory device and a memory system including the same according to at least one embodiment will be described with reference to FIG. 1 to FIG. 3.

FIG. 1 illustrates a block diagram of a memory system according to at least one embodiment. FIG. 2 illustrates a bank of a semiconductor memory device according to at least one embodiment. FIG. 3 illustrates a top plan view of a layout of components of a semiconductor memory device according to at least one embodiment.

Referring to FIG. 1, the memory system may include a memory controller 10 and a semiconductor memory device 20. The memory controller 10 is configured to control the semiconductor memory device 20 according to a request from a host. For example, the memory controller 10 may, in response to the request, provide a command and an address to the semiconductor memory device 20 to allow the semiconductor memory device 20 to perform an operation indicated by the command by referring to an address specified by the address.

The memory controller 10 may be configured to communicate with the host using various protocols. In some embodiments, the memory controller 10 may be included in the host. In these cases, the host may directly control the semiconductor memory device 20.

The semiconductor memory device 20 may be a dynamic random access memory (DRAM), but is not necessarily limited thereto. In some embodiments, the semiconductor memory device 20 may be a non-volatile memory such as a static random access memory (SRAM), a flash memory, etc.

The semiconductor memory device 20 may include at least one bank (BK1 to BK4) and at least one processing unit (PU) (PU1 to PU4). In at least some embodiments, the semiconductor memory device 20 may be a memory device with a processing in memory (PIM) structure. The semiconductor memory device 20 may be configured to perform a data read/write operation and/or a data processing operation according to the request from the host and/or according to the control of the memory controller 10.

The processing unit PU may be a neural processing unit (NPU), but is not limited thereto. In some embodiments, for example, the processing unit PU may be a graphic processing unit (GPU), an arithmetic logic unit (ALU), and/or the like. The processing unit PU may also be referred to as a processor.

When the processing unit PU is an NPU, the processing unit PU may be configured to perform an artificial neural network computation using data stored in the bank and/or data received from the host. For example, the data received from the host may correspond to an input vector, and the data stored in the bank may correspond to a weight matrix. The processing unit PU may be configured to perform a multiplication and accumulation (MAC) computation that multiplies the input vector and the weight matrix as inputs, and sums and outputs the multiplied results.

The semiconductor memory device 20 may include a plurality of banks BK1, BK2, BK3, and BK4 and a plurality of processing units PU1, PU2, PU3, and PU4. In some embodiments, the plurality of processing units PU1, PU2, PU3, and PU4 may be connected to one bank. Alternatively, in some embodiments, each of the plurality of processing units PU1, PU2, PU3, and PU4 may be connected to each of the plurality of banks PU1, PU2, PU3, and PU4. For example, the plurality of banks BK1, BK2, BK3, and BK4 may include a first bank BK1, a second bank BK2, a third bank BK3, and a fourth bank BK4. The plurality of processing units PU1, PU2, PU3, and PU4 may include a first processing unit PU1 connected to the first bank BK1, a second processing unit PU2 connected to the second bank BK2, a third processing unit PU3 connected to the third bank BK3, and a fourth processing unit PU4 connected to the fourth bank BK4.

FIG. 1 shows that the semiconductor memory device 20 includes four banks, but the present disclosure is not limited thereto. The number of banks included in the semiconductor memory device 20 may be variously changed, for example, may be 8, 16, 32, etc.

Figure 2:
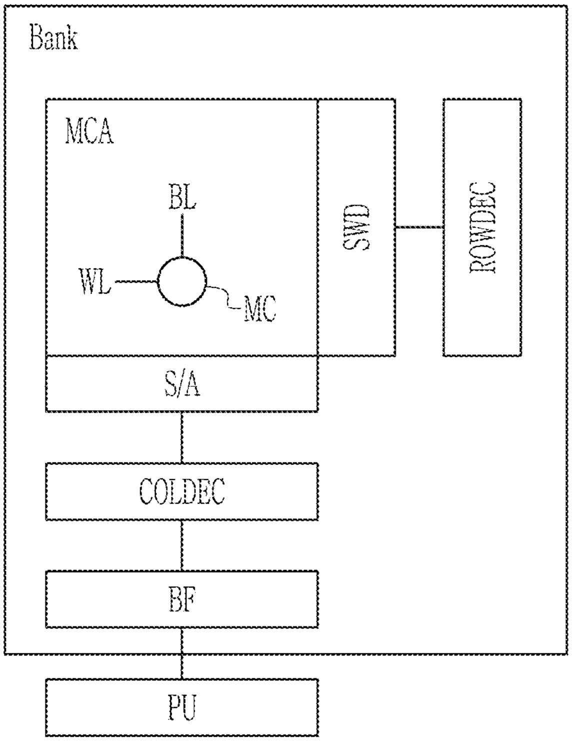
FIG. 2 illustrates a block diagram of a bank of a semiconductor memory device according to at least one embodiment.

Referring to FIG. 2, the bank may include a memory cell array MCA, a sense amplifier S/A, a sub-word line decoder SWD, a column decoder COLDEC, a row decoder ROWDEC, and a buffer BF. The bank may be connected to one or more processing units PU. In FIG. 2, the processing unit PU is shown as not included in the bank, but the examples are not necessarily limited thereto. In some embodiments, the processing unit PU may be included in the bank. The bank of FIG. 2 may be the first bank BK1, the second bank BK2, the third bank BK3, and/or the fourth bank BK4 of FIG. 1.

The bank may include a plurality of word lines WL disposed along the row direction and a plurality of bit lines BL disposed along the column direction. The memory cell array MCA of the bank may include a plurality of memory cells MC. The plurality of memory cells MC may each be disposed at a point where the plurality of word lines WL and the plurality of bit lines BL cross each other. The plurality of memory cells MC may be disposed in an array form. The plurality of memory cells MC may be connected to the sub-word line driver SWD and the row decoder ROWDEC through the word lines. The plurality of memory cells MC may be connected to the sense amplifier S/A and the column decoder COLDEC through the bit lines.

The row decoder ROWDEC may be configured to select a row corresponding to the address in response to a command and an address (for example, a row address) received from the memory controller (10 in FIG. 1). The column decoder COLDEC may select a column corresponding to the address in response to a command and an address (for example, a column address) received from the memory controller (10 in FIG. 1).

The sub-word line driver SWD may be configured to apply a voltage to a word line connected to the row selected by the row decoder ROWDEC. The sense amplifier S/A may be configured to sense and amplify a voltage difference between a pair of bit lines connected to the column selected by the column decoder COLDEC.

The buffer BF may be configured to temporarily store data read from the memory cell array MCA and/or data to be written to the memory cell array. The data stored in the buffer BF may be read from and/or written in a corresponding cell of the row and column selected by the row decoder ROWDEC and the column decoder COLDEC.

The processing unit PU may be connected to the bank and/or be configured to communicate with the bank. The processing unit PU may be connected to the buffer BF of the bank. The processing unit PU may be configured to perform a computation using data stored in the buffer BF. For example, the processing unit PU may include a logic circuit for performing a computation and a cache memory. The cache memory may temporarily store data obtained from the buffer BF and/or data received from the host for the computation of the processing unit PU.

Although FIGS. 1 and 2 illustrates banks to which the processing units PU are connected, in some embodiments, the semiconductor memory device 20 may additionally include at least one bank to which a processing unit PU is not connected. For the bank to which the processing unit PU is not connected, the description with reference to FIG. 2, excluding the processing unit PU, may be applied in the same manner.

Figure 3:
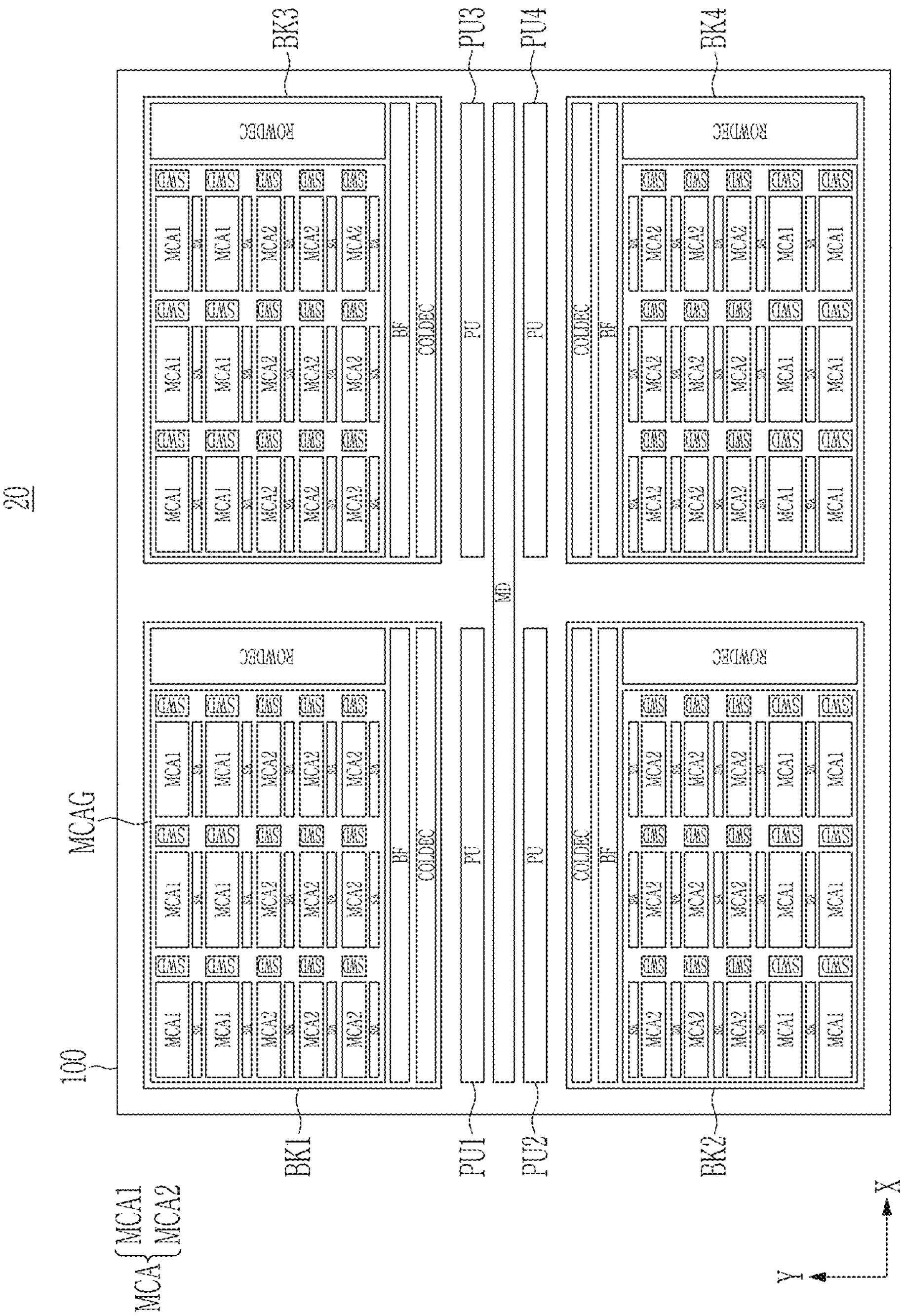
FIG. 3 illustrates a top plan view of a layout of components of a semiconductor memory device according to at least one embodiment.

FIG. 3 may be a top plan view of the semiconductor memory device 20 according to the embodiment shown in FIG. 1. Referring to FIG. 3, the semiconductor memory device 20 may include a substrate 100, a plurality of banks BK1, BK2, BK3, and BK4, a peripheral circuit MD, and a plurality of processing units PU1, PU2, PU3, and PU4.

The substrate 100 may include a semiconductor material (for example, silicon). The plurality of banks BK1, BK2, BK3, and BK4 may be disposed on the substrate 100. The plurality of banks BK1, BK2, BK3, and BK4 may be disposed in a first direction X and a second direction Y intersecting the first direction X. The second direction Y may be, for example, a direction perpendicular to the first direction X.

For example, the plurality of banks BK1, BK2, BK3, and BK4 may include a first bank BK1, a second bank BK2, a third bank BK3, and a fourth bank BK4. The first bank BK1 and the third bank BK3, and the second bank BK2 and the fourth bank BK4 may be disposed along the first direction X. The first bank BK1 and the second bank BK2, and the third bank BK3 and the fourth bank BK4 may be disposed along the second direction Y.

A peripheral circuit MD may be disposed between the plurality of banks BK1, BK2, BK3, and BK4. Although not shown, each of the plurality of banks BK1, BK2, BK3, and BK4 may be electrically connected to the peripheral circuit MD. The peripheral circuit MD may be disposed between the first bank BK1 and the second bank BK2, and between the third bank BK3 and the fourth bank BK4. The peripheral circuit MD may be disposed in an area extending along the first direction X. The first bank BK1 and the third bank BK3 may be disposed on one side of the peripheral circuit MD in the second direction Y, and the second bank BK2 and the fourth bank BK4 may be disposed on the other side (for example, opposite side) in the second direction Y.

The peripheral circuit MD may include a command/address buffer, a control logic circuit, a data input/output buffer, and/or the like. The command/address buffer may receive a command and an address from the memory controller (10 in FIG. 1). The control logic circuit may control access to the memory cell array MCA and control the processing unit PU based on the command and the address received from the memory controller (10 in FIG. 1). The data input/output buffer may store data received from the host, data read from the memory cell array MCA, and/or data received from the processing unit PU. The semiconductor memory device 20 may exchange data with the memory controller (10 in FIG. 1) through the data input/output buffer.

The processing units PU may be disposed to be adjacent to the peripheral circuit MD. Although not shown, the processing unit PU may be electrically connected to the peripheral circuit MD. The processing unit PU may be configured to perform a computation using data read from the bank and/or data received from the host. The processing units PU may be configured to provide the computed result to the memory controller (10 in FIG. 1) through the data input/output buffer of the peripheral circuit MD.

The semiconductor memory device 20 may include a plurality of processing units PU1, PU2, PU3, and PU4. In some embodiments, each of the plurality of processing units PU1, PU2, PU3, and PU4 may be connected to one bank. Each of the plurality of processing units PU1, PU2, PU3, and PU4 may be connected to each of the plurality of banks BK1, BK2, BK3, and BK4. For example, the plurality of processing units PU1, PU2, PU3, and PU4 may include a first processing unit PU1 connected to the first bank BK1, a second processing unit PU2 connected to the second bank BK2, a third processing unit PU3 connected to the third bank BK3, and a fourth processing unit PU4 connected to the fourth bank BK4.

In some embodiments, the semiconductor memory device 20 may simultaneously access the plurality of banks BK1, BK2, BK3, and BK4 under the control of the memory controller (10 in FIG. 1). For example, when a command received from the memory controller (10 in FIG. 1) indicates a computation operation, each of the plurality of processing units PU1, PU2, PU3, and PU4 may perform a computation using data read from each of the plurality of banks BK1, BK2, BK3, and BK4.

In some embodiments, each of the plurality of processing units PU1, PU2, PU3, and PU4 may be disposed between the peripheral circuit MD and corresponding ones of the plurality of banks BK1, BK2, BK3, and BK4. For example, the first processing unit PU1 may be disposed between first bank BK1 and the peripheral circuit MD, the second processing unit PU2 may be disposed between the second bank BK2 and the peripheral circuit MD, the third processing unit PU3 may be disposed between the third bank BK3. and the peripheral circuit MD, and the fourth processing unit PU4 may be disposed between the fourth bank BK4 and the peripheral circuit MD.

In some embodiments, each of the plurality of banks BK1, BK2, BK3, and BK4 may include a memory cell array group MCAG, a row decoder ROWDEC, a column decoder COLDEC, and a buffer BF. The memory cell array group MCAG may include a plurality of memory cell arrays MCA. The plurality of memory cell arrays MCA may be disposed in an array form. The memory cell array group MCAG may include a sense amplifier S/A and a sub-word line driver SWD for each memory cell array MCA. Although not shown, the sense amplifier S/A may be connected to the memory cell array MCA through a bit line. The sense amplifier S/A may be disposed in parallel with the memory cell array MCA in a bit line extension direction. Although not shown, the sub-word line driver SWD may be connected to the memory cell array MCA through a word line. The sub-word line driver SWD may be disposed in parallel with the memory cell array MCA in a word line direction. In FIG. 3, the word line extension direction may be the first direction X, and the bit line extension direction may be the second direction Y.

Although not shown, the row decoder ROWDEC may be connected to the sub-word line driver SWD of each of the plurality of memory cell arrays MCA through a word line. The row decoder ROWDEC may be disposed in parallel with the plurality of memory cell arrays MCA in the word line extension direction. Although not shown, the column decoder COLDEC and the buffer BF may be connected to the plurality of memory cell arrays MCA through bit lines. The column decoder COLDEC and the buffer BF may be disposed in parallel with the plurality of memory cell arrays MCA in the bit line extension direction.

In FIG. 3, the buffer BF is shown to be disposed closer to the plurality of memory cell arrays MCA than the column decoder COLDEC, but the examples are not necessarily limited thereto. Depending on embodiments, the disposition order of the buffer BF and the column decoder COLDEC may be changed.

The memory cell array MCA may include a first memory cell array MCA1 and a second memory cell array MCA2. The first memory cell array MCA1 may have a first size, and the second memory cell array MCA2 may have a second size. The second size may be smaller than the first size. The first size and the second size may depend on the number of rows of each of the first memory cell array MCA1 and the second memory cell array MCA2. That is, the second memory cell array MCA2 may have the same number of columns as the first memory cell array MCA1, but may have fewer rows than the first memory cell array MCA1. Accordingly, a length of the second memory cell array MCA2 along the second direction Y may be smaller than that of the first memory cell array MCA1 along the second direction Y. A length of the second memory cell array MCA2 along the first direction X may be substantially the same as that of the first memory cell array MCA1 along the first direction X.

In some embodiments, each of the plurality of banks BK1, BK2, BK3, and BK4 may include a first memory cell array MCA1 having the first size and a second memory cell array MCA2 having the second size. Hereinafter, the first bank BK1 will be described, but the content described later may be equally applied to the second bank BK2, the third bank BK3, or the fourth bank BK4.

In some embodiments, in the first bank BK1, the second memory cell array MCA2 may be disposed closer to the processing unit PU than the first memory cell array MCA1. A distance between the second memory cell array MCA2 and the processing unit PU of the first bank BK1 may be closer than that between the first memory cell array MCA1 and the processing unit PU of the first bank BK1.

In some embodiments, the disposition of the plurality of memory cell arrays MCA of each of the plurality of banks BK1, BK2, BK3, and BK4 may have a symmetrical structure with respect to the peripheral circuit MD.

According to some embodiments, the plurality of banks BK1, BK2, BK3, and BK4 of the semiconductor memory device 20 may include a first memory cell array MCA1 having a first size and a second memory cell array MCA2 having a second size smaller than the first size, and the processing unit PU may be disposed adjacent to the second memory cell array MCA2.

Since the second memory cell array MCA2 is smaller than the first memory cell array MCA1, the relative distance between each of the cells of the second memory cell array MCA2 to the corresponding sense amplifier S/A is shorter than the relative distance between each the first memory cell array MCA1 and the corresponding sense amplifier S/A. Therefore, since the distance between the cells and the sense amplifier S/A in the second memory cell arrays MCA2 is shorter than that the distance between the cells and the sense amplifier S/A in the first memory cell arrays MCA1, the access speed to the second memory cell array MCA2 may be faster. For example, when the processing unit PU needs to perform large-scale computations, such as artificial neural network computations, high-speed access to the memory cell array MCA may be required. Additionally, according to some embodiments, since the processing unit PU is disposed adjacent to the second memory cell array MCA2 (having a faster access speed than the first memory cell array MCA1) the artificial neural network computation performance of the semiconductor memory device 20 may be further improved.

Meanwhile, since the first memory cell array MCA1 has a larger number of cells than the second memory cell array MCA2, the semiconductor memory device 20 may store more data in the first memory cell array MCA1 than in the second memory cell array MCA2. For example, the memory controller (10 in FIG. 1) may control the semiconductor memory device 20 in a first mode that performs a general data read/write operation and a second mode that performs computation using a processing unit PU. The semiconductor memory device 20 may use the first memory cell array MCA1 (configured to store more data) in the first mode and use the second memory cell array MCA2 (configured to operate with higher speed) in the second mode, but the examples are not limited thereto. For example, the semiconductor memory device 20 may further use the second memory cell array MCA2 as well as the first memory cell array MCA1 in the first mode, and/or may further use the first memory cell array MCA1 as well as the second memory cell array MCA2 in the second mode. In at least some embodiments, the first mode may be, e.g., a training mode for an artificial neural network (wherein the data stored in the semiconductor memory device 20 is updated, added to, etc.) and/or the second mode may be, e.g., an inference mode for the artificial neural network (wherein the data stored in the semiconductor memory device 20 is applied as, e.g., a weight in an artificial neural network computation and an inference derived from a result of the an artificial neural network computation). In at least some embodiments, the training operation of the artificial neural network may include monitoring the artificial network computations to determine how frequently data is accessed and storing more frequently accessed data in the second memory cell array MCA2 and storing less frequently accessed data in the first memory cell array MCA1. However, the examples are not limited thereto.

In banks including the same number of cells, the area of the sense amplifier S/A in the bank including only of the second memory cell array MCA2 increases compared to the bank including only of the first memory cell array MCA1, so that the area of the bank may increase. A bank in which the first memory cell array MCA1 and the second memory cell array MCA2 are mixed may have a smaller area increase than a bank configured of only the second memory cell array MCA2. Accordingly, the semiconductor memory device 20 in which each of the plurality of banks BK1, BK2, BK3, and BK4 includes the first memory cell array MCA1 and the second memory cell array MCA2 may improve artificial neural network computation performance while minimizing or reducing an increase in size.

Hereinafter, a semiconductor memory device according to at least one embodiment will be described with reference to FIG. 4.

Figure 4:
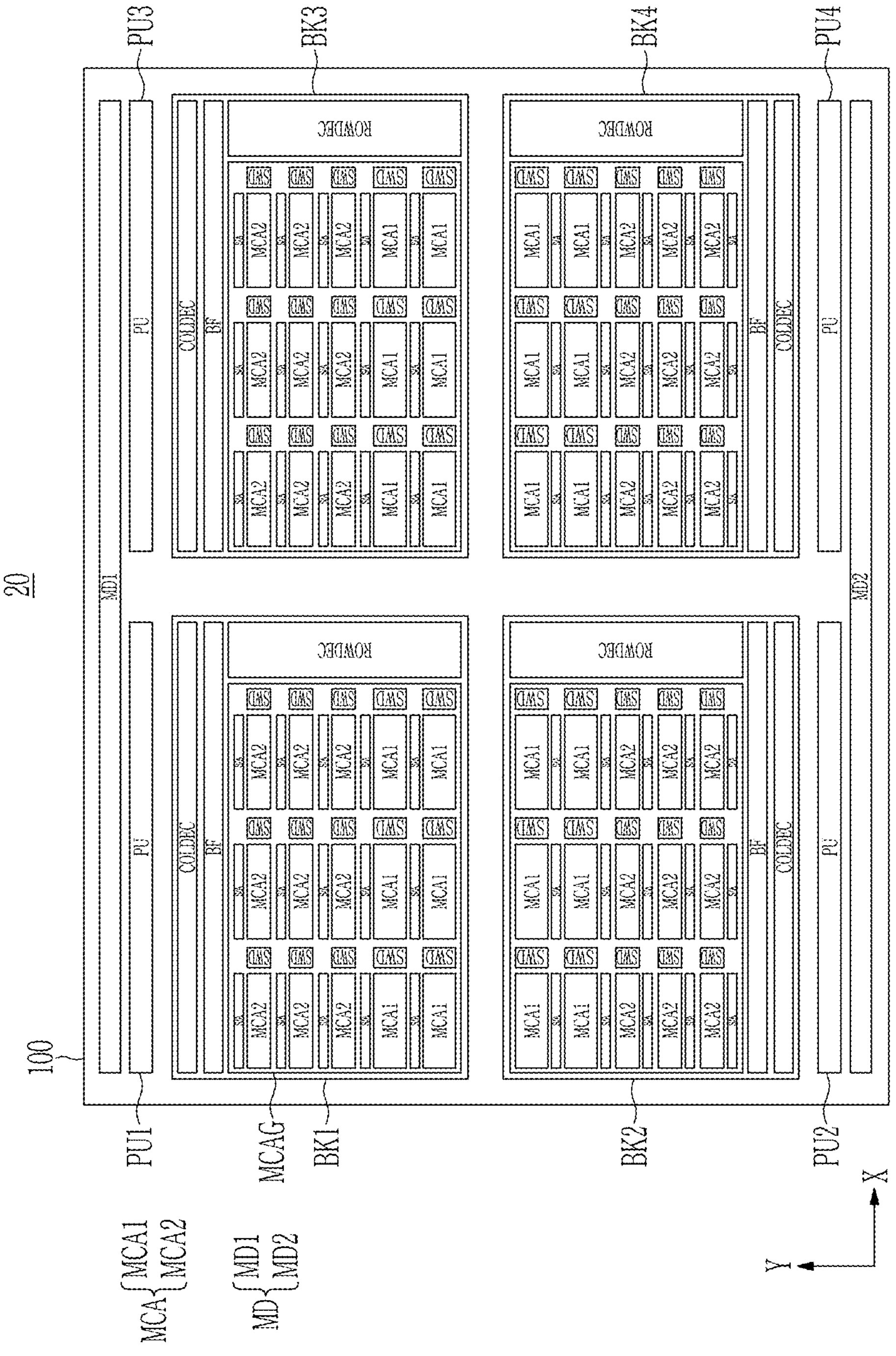
FIG. 4 illustrates a top plan view of a layout of components of a semiconductor memory device according to at least one embodiment.

FIG. 4 illustrates a top plan view of a layout of components of a semiconductor memory device according to at least one embodiment. FIG. 4 may be a top plan view of the semiconductor memory device 20 according to some embodiments shown in FIG. 1. Hereinafter, differences between FIG. 4 and FIG. 3 will be mainly described, and redundant descriptions will be simplified or omitted.

Referring to FIG. 4, the peripheral circuit MD may include a first peripheral circuit MD1 and a second peripheral circuit MD2. According to the above description, the peripheral circuit MD may include a command/address buffer, a control logic circuit, a data input/output buffer, and/or the like. Some of the components of the peripheral circuit MD may be included in the first peripheral circuit MD1, and the remaining components may be included in the second peripheral circuit MD2. Each of the plurality of banks BK1, BK2, BK3, and BK4 may be electrically connected to the first peripheral circuit MD1 and the second peripheral circuit MD2.

In some embodiments, the first peripheral circuit MD1 and the second peripheral circuit MD2 may be spaced apart from each other with the plurality of banks BK1, BK2, BK3, and BK4 interposed therebetween. Each of the first peripheral circuit MD1 and the second peripheral circuit MD2 may be disposed in an area extending along the first direction X. For example, between the first peripheral circuit MD1 and the second peripheral circuit MD2, the first bank BK1 and the second bank BK2 may be disposed along the second direction Y, and the third bank BK3 and the fourth bank BK4 may be disposed along the second direction Y. Between the first peripheral circuit MD1 and the second peripheral circuit MD2, the first bank BK1 and the third bank BK3 may be disposed along the first direction X, and the second bank BK2 and the fourth bank BK4 may be disposed along the first direction X. For example, the first bank BK1 and the third bank BK3 may be disposed adjacent to the first peripheral circuit MD1, and the second bank BK2 and the fourth bank BK4 may be disposed adjacent to the second peripheral circuit MD2.

Meanwhile, although not shown, some banks may be disposed at an upper side of the first peripheral circuit MD1 and a lower side of the second peripheral circuit MD2.

The plurality of processing units PU1, PU2, PU3, and PU4 may be disposed between the plurality of banks BK1, BK2, BK3, and BK4 and the first peripheral circuit MD1, or between the plurality of banks BK1, BK2, BK3, and BK4 and the second peripheral circuit MD2. For example, the first processing unit PU1 may be disposed between the first bank BK1 and the first peripheral circuit MD1, and the third processing unit PU3 may be disposed between the third bank BK3 and the first peripheral circuit MD1. The second processing unit PU2 may be disposed between the second bank BK2 and the second peripheral circuit MD2, and the fourth processing unit PU4 may be disposed between the fourth bank BK4 and the second peripheral circuit MD2.

According to some embodiments, the second memory cell array MCA2 may be disposed adjacent to the processing unit PU in each of the plurality of banks BK1, BK2, BK3, and BK4.

In some embodiments of FIG. 3, the peripheral circuit MD and the plurality of processing units PU1, PU2, PU3, and PU4 may be disposed in a central portion of an area in which the plurality of banks BK1, BK2, BK3, and BK4 are disposed on the substrate 100. Accordingly, the second sub-memory cell array MCA may be disposed adjacent to the central portion in each of the plurality of banks BK1, BK2, BK3, and BK4.

Unlike the embodiments of FIG. 3, in some embodiments of FIG. 4, the first peripheral circuit MD1 and the second peripheral circuit MD2 and a plurality of processing units PU1, PU2, PU3, and PU4 may be disposed on the substrate 100 at an edge portion of an area in which the plurality of banks BK1, BK2, BK3, and BK4 are disposed. Accordingly, the second sub-memory cell array MCA may be disposed adjacent to the edge portion in each of the plurality of banks BK1, BK2, BK3, and BK4.

In some embodiments, the disposition of the plurality of memory cell arrays MCA of each of the plurality of banks BK1, BK2, BK3, and BK4 may have a symmetrical structure with respect to an area on the substrate 100 extending along the first direction X between the first bank BK1 and the second bank BK2 and between the third bank BK3 and the fourth bank BK4.

The embodiments of FIG. 4 may have the same (and/or substantially similar) effect as that of some embodiments of FIG. 4. According to some embodiments, each of the plurality of banks BK1, BK2, BK3, and BK4 includes the first memory cell array MCA1 and the second memory cell array MCA2, and the processing unit PU is disposed adjacent to the second memory cell array MCA2, so that the artificial neural network computation performance may be improved while minimizing or reducing the increase in size of the semiconductor memory device 20.

Hereinafter, a semiconductor memory device and a memory system including the same according to at least one embodiment will be described with reference to FIG. 5 and FIG. 6.

Figure 5:
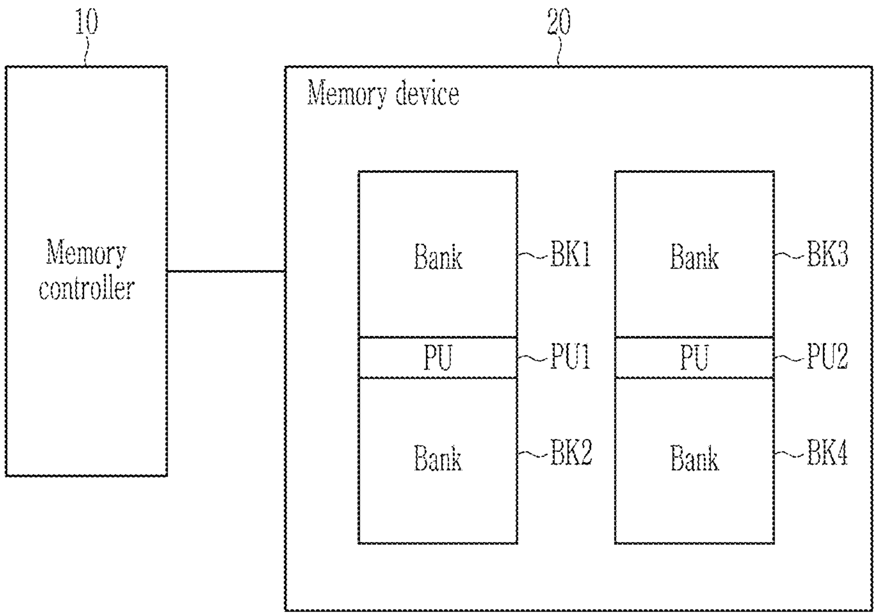
FIG. 5 illustrates a block diagram of a memory system according to at least one embodiment.

FIG. 5 illustrates a block diagram of a memory system according to at least one embodiment. FIG. 6 illustrates a top plan view of a layout of components of a semiconductor memory device according to at least one embodiment. Hereinafter, differences between FIG. 5 to FIG. 6 and FIG. 1 to FIG. 3 will be mainly described, and redundant descriptions will be simplified or omitted.

Referring to FIG. 5, the memory system may include a memory controller 10 and a semiconductor memory device 20. The semiconductor memory device 20 may include a bank and a processing unit PU. The semiconductor memory device 20 may include a plurality of banks BK1, BK2, BK3, and BK4. For example, the plurality of banks BK1, BK2, BK3, and BK4 may include a first bank BK1, a second bank BK2, a third bank BK3, and a fourth bank BK4. The description of the banks described with reference to FIG. 2 may be applied in the same or similar manner to the first bank BK1, the second bank BK2, the third bank BK3, or the fourth bank BK4.

According to some embodiments, the processing unit PU may be connected to at least two banks. The semiconductor memory device 20 may include a plurality of processing units PU1 and PU2. For example, the plurality of processing units PU1 and PU2 may include a first processing unit PU1 connected to the first bank BK1 and the second bank BK2, and a second processing unit PU2 connected to the third bank BK3 and the fourth bank BK4. Although FIG. 5 illustrates that one processing unit PU is connected to two banks, the present disclosure is not limited thereto. In some embodiments, the number of banks connected to one processing unit PU may be three or more.

Referring to FIG. 2 and FIG. 5 together, the first processing unit PU1 may be connected to the buffer BF of the first bank BK1 and the buffer BF of the second bank BK2, and the second processing unit PU2 may be connected to the buffer BF of the third bank BK3 and the buffer BF of the fourth bank BK4. The first processing unit PU1 may perform computations using data stored in the buffer BF of the first bank BK1 and/or data stored in the buffer BF of the second bank BK2. The second processing unit PU2 may perform computations using data stored in the buffer BF of the third bank BK3 and/or data stored in the buffer BF of the fourth bank BK4.

Figure 6:
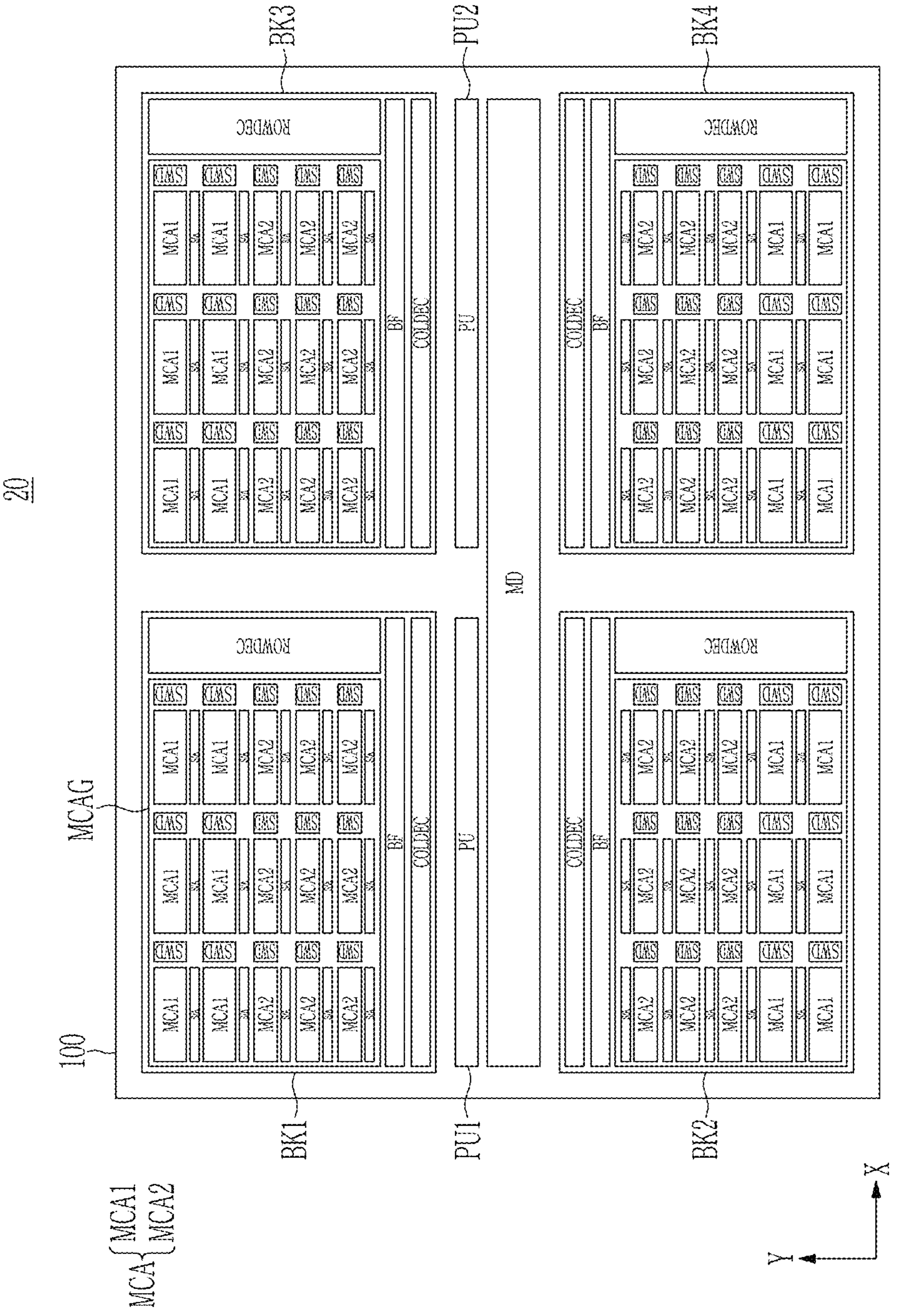
FIG. 6 illustrates a top plan view of a layout of components of a semiconductor memory device according to at least one embodiment.

Referring to FIG. 6, the first bank BK1, the second bank BK2, the third bank BK3, and the fourth bank BK4 may be disposed on the substrate 100. The first bank BK1 and the third bank BK3, and the second bank BK2 and the fourth bank BK4 may be disposed along the first direction X. The first bank BK1 and the second bank BK2, and the third bank BK3 and the fourth bank BK4 may be disposed along the second direction Y that intersects the first direction X. The second direction Y may be, for example, a direction perpendicular to the first direction X.

The peripheral circuit MD may be disposed between pairs of the first bank BK1 the second bank BK2, the third bank BK3 and the fourth bank BK4. For example, the peripheral circuit MD may be disposed between the first bank BK1 and the second bank BK2, and between the third bank BK3 and the fourth bank BK4. The peripheral circuit MD may be disposed in an area extending along the first direction X.

According to some embodiments, two banks connected to one processing unit PU may be divided and disposed on one side and the opposite side (or the other side) of the peripheral circuit MD. For example, the first bank BK1 and the second bank BK2 connected to the first processing unit PU1 may be divided and disposed on one side and the opposite side of the peripheral circuit MD in the second direction Y. The third bank BK3 and the fourth bank BK4 connected to the second processing unit PU2 may be divided and disposed on one side and the opposite side of the peripheral circuit MD in the second direction Y. For example, the first bank BK1 and the third bank BK3 may be disposed on one side of the peripheral circuit MD in the second direction Y, and the second bank BK2 and the fourth bank BK4 may be disposed on the opposite side thereof.

According to some embodiments, the processing unit PU may be disposed between the peripheral circuit MD and one of two banks connected to the processing unit PU. For example, the first processing unit PU1 may be disposed between one of the first bank BK1 and the second bank BK2 and the peripheral circuit MD. The second processing unit PU2 may be disposed between one of the third bank BK3 and the fourth bank BK4 and the peripheral circuit MD. For example, the first processing unit PU1 may be disposed between the first bank BK1 and the peripheral circuit MD, and the second processing unit PU2 may be disposed between the third bank BK3 and the peripheral circuit MD. However, some embodiments are not limited thereto. As another example, the first processing unit PU1 may be disposed between the second bank BK2 and the peripheral circuit MD, and the second processing unit PU2 may be disposed between the fourth bank BK4 and the peripheral circuit MD.

Although FIG. 6 shows that two banks connected to one processing unit PU are divided and disposed on one side and the opposite side of the peripheral circuit MD, some embodiments are not necessarily limited thereto. In some embodiments, all two banks connected to one processing unit PU may be disposed on one side of the peripheral circuit MD. In these cases, the processing unit PU may be disposed between the peripheral circuit (MD) and a bank adjacent to the peripheral circuit MD among the two banks. When two banks are spaced apart from the peripheral circuit MD by the same distance, the processing unit PU may be disposed between both banks and the peripheral circuit MD.

Although FIG. 6 illustrates that two banks are connected to one processing unit PU, some embodiments are not limited thereto. In some embodiments, even when three or more banks are connected to one processing unit PU, the above-described disposition may be equally or similarly applied to a plurality of banks and processing units PU connected to one processing unit PU.

According to some embodiments, each of the first bank BK1, the second bank BK2, the third bank BK3, and the fourth bank BK4 may include a first memory cell array MCA1 having a first size and a second memory cell array MCA2 having a second size; wherein the second size is smaller than the first size. In each of the first bank BK1, the second bank BK2, the third bank BK3, and the fourth bank BK4, the second memory cell array MCA2 may be disposed closer to the processing unit PU than the first memory cell array MCA1. For each of the first bank BK1, the second bank BK2, the third bank BK3, and the fourth bank BK4, a distance between the second memory cell array MCA2 and the processing unit PU of each bank may be closer than a distance between the first memory cell array MCA1 and the processing unit PU of each bank.

In some embodiments, the disposition of the plurality of memory cell arrays MCA of each of the first bank BK1, the second bank BK2, the third bank BK3, and the fourth bank BK4 may have a symmetrical structure with respect to the peripheral circuit MD.

The embodiments of FIG. 5 and FIG. 6 may have the same and/or similar effect as that of some embodiments of FIG. 1 to FIG. 3. According to some embodiments, each of the plurality of banks BK1, BK2, BK3, and BK4 includes the first memory cell array MCA1 and the second memory cell array MCA2, and the processing unit PU is disposed adjacent to the second memory cell array MCA2, so that the artificial neural network computation performance may be improved while minimizing or reducing the increase in size of the semiconductor memory device 20.

Hereinafter, a semiconductor memory device according to at least one embodiment will be described with reference to FIG. 7.

Figure 7:
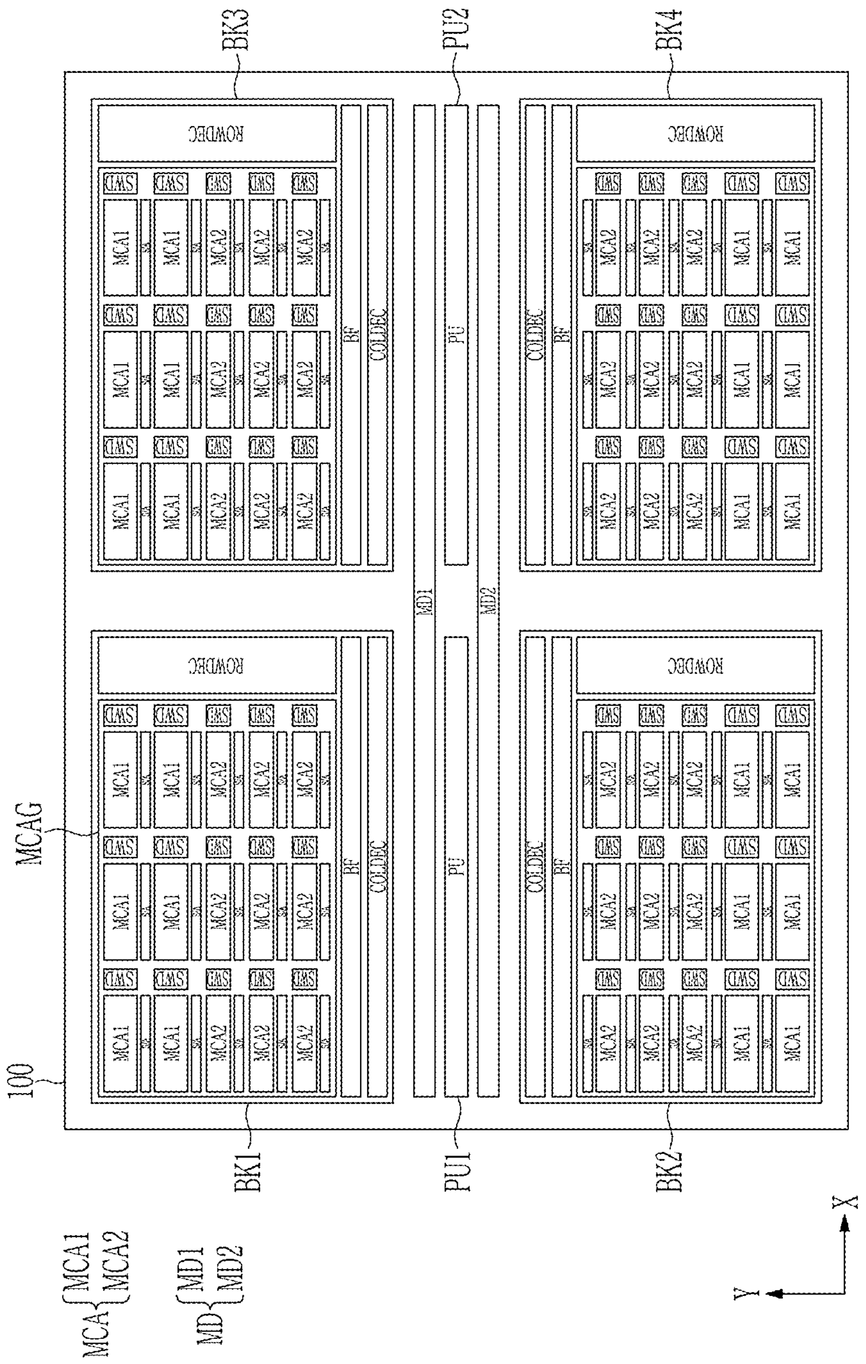
FIG. 7 illustrates a top plan view of a layout of components of a semiconductor memory device according to at least one embodiment.

FIG. 7 illustrates a top plan view of a layout of components of a semiconductor memory device according to at least one embodiment. FIG. 7 may be a top plan view of the semiconductor memory device 20 according to some embodiments shown in FIG. 5. Hereinafter, differences between FIG. 7 and FIG. 6 will be mainly described, and redundant descriptions will be simplified or omitted.

Referring to FIG. 7, the peripheral circuit MD may include a first peripheral circuit MD1 and a second peripheral circuit MD2. According to the above description, the peripheral circuit MD may include a command/address buffer, a control logic circuit, a data input/output buffer, and/or the like. Some of the components of the peripheral circuit MD may be included in the first peripheral circuit MD1, and the remaining components may be included in the second peripheral circuit MD2. Each of the plurality of banks BK1, BK2, BK3, and BK4 may be electrically connected to the first peripheral circuit MD1 and/or the second peripheral circuit MD2.

In some embodiments, the first peripheral circuit MD1 and the second peripheral circuit MD2 may be spaced apart from each other with the plurality of processing units PU1 and PU2 interposed therebetween. For example, the plurality of processing units PU1 and PU2 may include a first processing unit PU1 connected to the first bank BK1 and the second bank BK2, and a second processing unit PU2 connected to the third bank BK3 and the fourth bank BK4. Each of the first peripheral circuit MD1 and the second peripheral circuit MD2 may be disposed in an area extending along the first direction X. For example, between the first peripheral circuit MD1 and the second peripheral circuit MD2, the first processing unit PU1 and the second processing unit PU2 may be disposed along the first direction X.

In some embodiments, two banks connected to one processing unit PU may be divided and disposed on one side and the opposite side of the processing unit PU. For example, the first bank BK1 and the second bank BK2 connected to the first processing unit PU1 may be divided and disposed on one side and the opposite side of the first processing unit PU1 in the second direction Y. The third bank BK3 and the fourth bank BK4 connected to the second processing unit PU2 may be divided and disposed on one side and the opposite side of the second processing unit PU2 in the second direction Y. For example, the first bank BK1 and the third bank BK3 may be disposed on the same side in the second direction Y, and the second bank BK2 and the fourth bank BK4 may be disposed on the opposite side.

In some embodiments, each of the first peripheral circuit MD1 and the second peripheral circuit MD2 may be disposed between the processing unit PU and the bank connected to the processing unit PU. Among the two banks connected to the processing unit PU, the first peripheral circuit MD1 may be disposed between the bank disposed on one side of the processing unit PU and the processing unit PU, and the second peripheral circuit MD2 may be disposed between the bank disposed on the opposite side of the processing unit PU and the processing unit PU.

For example, among the first bank BK1 and the second bank BK2 connected to the first processing unit PU1, the first peripheral circuit MD1 may be disposed between the first bank BK1 and the first processing unit PU1, and the second peripheral circuit MD2 may be disposed between the second bank BK2 thereof and the first processing unit PU1. Among the third bank BK3 and the fourth bank BK4 connected to the second processing unit PU2, the first peripheral circuit MD1 may be disposed between the third bank BK3 and the second processing unit PU2, and the second peripheral circuit MD2 may be disposed between the fourth bank BK4 and the second processing unit PU2.

That is, the first peripheral circuit MD1 may be disposed between the first bank BK1 and the first processing unit PU1, and between the third bank BK3 and the second processing unit PU2. The second peripheral circuit MD2 may be disposed between the second bank BK2 and the first processing unit PU1, and between the fourth bank BK4 and the second processing unit PU2.

Some embodiments of FIG. 7 may have the same and/or similar effect as that of some embodiments of FIG. 6. According to some embodiments, each of the plurality of banks BK1, BK2, BK3, and BK4 includes the first memory cell array MCA1 and the second memory cell array MCA2, and the processing unit PU is disposed adjacent to the second memory cell array MCA2, so that the artificial neural network computation performance may be improved while minimizing or reducing the increase in size of the semiconductor memory device 20.

Hereinafter, a semiconductor memory device and a memory system including the same according to at least one embodiment will be described with reference to FIG. 8 and FIG. 9.

Figure 8:
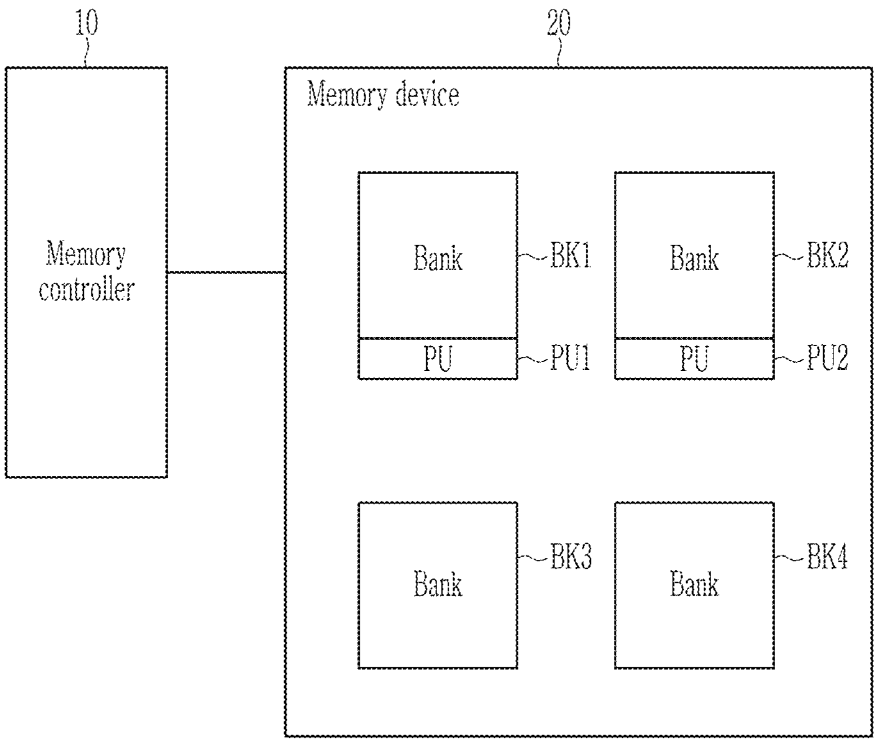
FIG. 8 illustrates a block diagram of a memory system according to at least one embodiment.

FIG. 8 illustrates a block diagram of a memory system according to at least one embodiment. FIG. 9 illustrates a top plan view of a layout of components of a semiconductor memory device according to at least one embodiment. Hereinafter, differences between FIG. 8 to FIG. 9 and FIG. 1 to FIG. 3 will be mainly described, and redundant descriptions will be simplified or omitted.

Referring to FIG. 8, the memory system may include a memory controller 10 and a semiconductor memory device 20. The semiconductor memory device 20 may include a bank and a processing unit PU. The semiconductor memory device 20 may include a plurality of banks BK1, BK2, BK3, and BK4. For example, the plurality of banks BK1, BK2, BK3, and BK4 may include a first bank BK1, a second bank BK2, a third bank BK3, and a fourth bank BK4. The description of the banks described with reference to FIG. 2 may be applied in the same or similar manner to the first bank BK1, the second bank BK2, the third bank BK3, or the fourth bank BK4.

In some embodiments, the semiconductor memory device 20 may include a plurality of processing units PU1 and PU2. For example, the plurality of processing units PU1 and PU2 may include a first processing unit PU1 connected to the first bank BK1 and a second processing unit PU2 connected to the second bank BK2.

Although FIG. 8 shows that the processing unit PU is not connected to the third bank BK3 and the fourth bank BK4, some embodiments are not necessarily limited thereto. In some embodiments, the semiconductor memory device 20 may further include at least one processing unit PU connected to the third bank BK3 and/or the fourth bank BK4.

Figure 9:
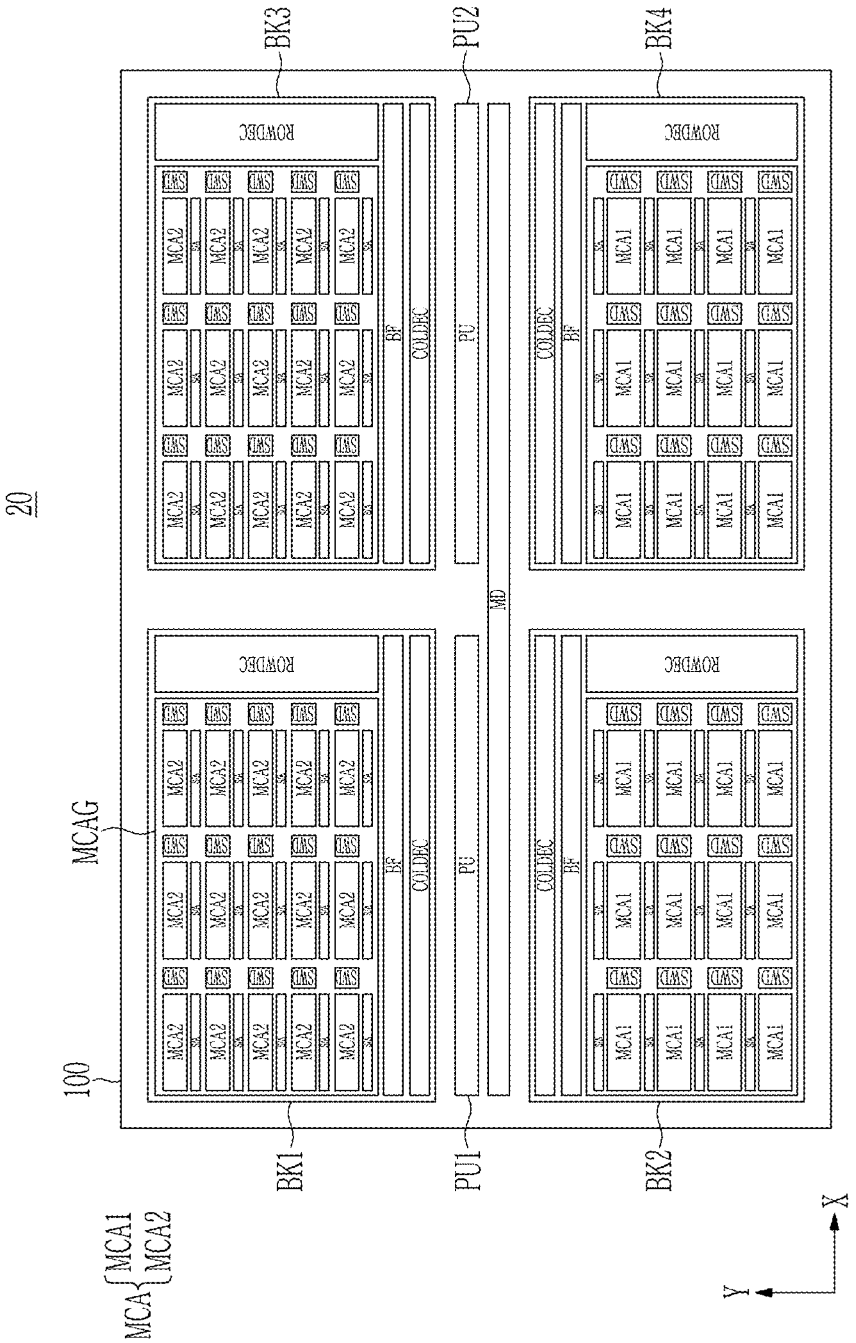
FIG. 9 illustrates a top plan view of a layout of components of a semiconductor memory device according to at least one embodiment.

Referring to FIG. 9, the first bank BK1, the second bank BK2, the third bank BK3, and the fourth bank BK4 may be disposed on the substrate 100. For example, the first bank BK1 and the second bank BK2, and the third bank BK3 and the fourth bank BK4 may be disposed along the first direction X. The first bank BK1 and the third bank BK3, and the second bank BK2 and the fourth bank BK4 may be disposed along the second direction Y that intersects the first direction X. The second direction Y may be, for example, a direction perpendicular to the first direction X.

In some embodiments, the first bank BK1 and the second bank BK2 may include the second memory cell array MCA2, and the third bank BK3 and the fourth bank BK4 may include the first memory cell array MCA1. The second memory cell array MCA2 may have the second size, and the first memory cell array MCA1 may have the first size. The second size may be smaller than the first size.

In some embodiments, the processing unit PU may be disposed closer to the first bank BK1 or the second bank BK2 including the second memory cell array MCA2 than the third bank BK3 or the fourth bank BK4 including the first memory cell array MCA1. For example, the first processing unit PU1 may be disposed closer to the first bank BK1 than the third bank BK3, and the second processing unit PU2 may be disposed closer to the second bank BK2 than the fourth bank BK4.

The peripheral circuit MD may be disposed between the first bank BK1 and the third bank BK3, and between the second bank BK2 and the fourth bank BK4. The peripheral circuit MD may be disposed in an area extending along the first direction X. The first bank BK1 and the second bank BK2 including the second memory cell array MCA2 may be disposed on one side of the peripheral circuit MD in the second direction Y, and the third bank BK3 and the fourth bank BK4 including the first memory cell array MCA1 may be disposed on the other side (for example, opposite side) of the peripheral circuit MD in the second direction Y.

In some embodiments, the disposition of the plurality of memory cell arrays MCA of each of the plurality of banks BK1, BK2, BK3, and BK4 may have an asymmetric structure with respect to the peripheral circuit MD. For example, banks facing each other with the peripheral circuit MD interposed therebetween may include memory cell arrays MCA having different sizes.

In some embodiments, the processing unit PU may be disposed between the peripheral circuit MD and the first bank BK1 or the second bank BK2 including the second memory cell array MCA2. For example, the first processing unit PU1 may be disposed between the peripheral circuit MD and the first bank BK1, and the second processing unit PU2 may be disposed between the peripheral circuit MD and the second bank BK2.

According to some embodiments, the plurality of banks BK1, BK2, BK3, and BK4 of the semiconductor memory device 20 may include banks (for example, the third banks BK3 and the fourth banks BK4) including the first memory cell array MCA1 of the first size and banks (for example, the first banks BK1 and the second banks BK2) including the second memory cell array MCA2 of the second size smaller than the first size. The processing unit PU may be disposed adjacent to the bank including the second memory cell array MCA2.

Since the distance between the cell and the sense amplifier S/A in the second memory cell array MCA2 is shorter than that of the first memory cell array MCA1, the access speed to the second memory cell array MCA2 may be faster than that of the first memory cell array MCA1. For example, when the processing unit PU needs to perform large-scale computations such as artificial neural network computations, high-speed access to the memory cell array MCA may be required. According to some embodiments, the processing unit PU is disposed adjacent to the bank including the second memory cell array MCA2 having a faster access speed than the first memory cell array MCA1, so that the artificial neural network computation performance of the semiconductor memory device 20 may be improved.

In the banks including the same (or similar) number of cells, the bank including the second memory cell array MCA2 may occupy a larger area than a bank including the first memory cell array MCA1 instead of having a faster access speed. Some embodiments of FIG. 8 in which the bank including the first memory cell array MCA1 and the bank including the second memory cell array MCA2 are mixed may have a smaller size of the semiconductor memory device 20 than a comparative example configured of only the bank including the second memory cell array MCA2. According to some embodiments, the plurality of banks BK1, BK2, BK3, and BK4 include the bank including the first memory cell array MCA1 and the bank including the second memory cell array MCA2, so that the semiconductor memory device 20 may improve artificial neural network computation performance while minimizing or reducing an increase in size.

In some embodiments, the memory controller 10 of FIG. 8 and the semiconductor memory device 20 may be connected to each other through one channel, but are not limited thereto. In some embodiments, the memory controller (10 in FIG. 8) and the semiconductor memory device 20 may be connected to each other through two channels. For example, the memory controller (10 in FIG. 8) may be connected to the third bank BK3 and the fourth bank BK4 including the first memory cell array MCA1 through a first channel, and may be connected to the first bank BK1 and the second bank BK2 including the second memory cell array MCA2 through a second channel.

For example, the memory controller (10 in FIG. 8) may control the semiconductor memory device 20 in a first mode that performs a general data read/write operation and a second mode that performs computation using a processing unit PU. The semiconductor memory device 20 may use the third bank BK3 and fourth bank BK4 including the first memory cell array MCA1 in the first mode, and may use the first bank BK1 and second bank BK2 including the second memory cell array MCA2 in the second mode. When the first mode and the second mode operate simultaneously in the semiconductor memory device 20, the memory controller (10 in FIG. 8) may access the third bank BK3 and the fourth bank BK4 through the first channel, and access the first bank BK1 and the second bank BK2 through the second channel. The access through the first channel and the access through the second channel may be independently performed.

Hereinafter, a semiconductor memory device according to at least one embodiment will be described with reference to FIG. 10.

Figure 10:
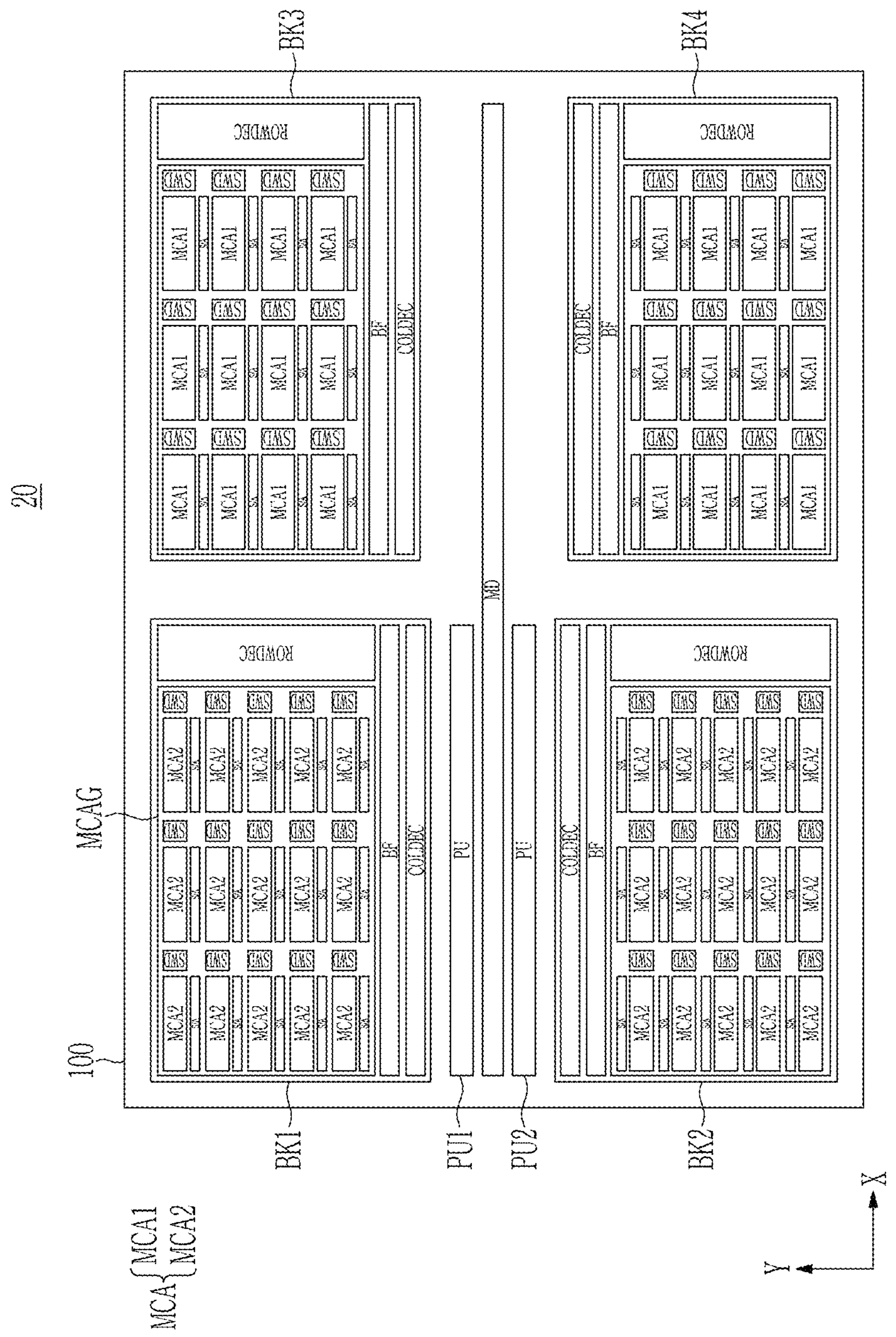
FIG. 10 illustrates a top plan view of a layout of components of a semiconductor memory device according to at least one embodiment.

FIG. 10 illustrates a top plan view of a layout of components of a semiconductor memory device according to at least one embodiment. FIG. 10 may be a top plan view of the semiconductor memory device 20 according to some embodiments shown in FIG. 8. Hereinafter, differences between FIG. 10 and FIG. 9 will be mainly described, and redundant descriptions will be simplified or omitted.

Referring to FIG. 10, the first bank BK1, the second bank BK2, the third bank BK3, and the fourth bank BK4 may be disposed on the substrate 100. For example, the first bank BK1 and the third bank BK3, and the second bank BK2 and the fourth bank BK4 may be disposed along the first direction X. The first bank BK1 and the second bank BK2, and the third bank BK3 and the fourth bank BK4 may be disposed along the second direction Y that intersects the first direction X. The second direction Y may be, for example, a direction perpendicular to the first direction X.

In some embodiments of FIG. 10, like some embodiments of FIG. 9, the first bank BK1 and the second bank BK2 may include a second memory cell array MCA2, and the third bank BK3 and the fourth bank BK4 may include a first memory cell array MCA1. The second memory cell array MCA2 may have the second size, and the first memory cell array MCA1 may have the first size. The second size may be smaller than the first size.

The peripheral circuit MD may be disposed between the first bank BK1 and the second bank BK2, and between the third bank BK3 and the fourth bank BK4. The peripheral circuit MD may be disposed in an area extending along the first direction X. In some embodiments, a plurality of banks including the first memory cell array MCA1 may be divided and disposed on one side and the opposite side of the peripheral circuit MD. A plurality of banks including the second memory cell array MCA2 may be divided and disposed on one side and the opposite side of the peripheral circuit MD.

For example, among the first bank BK1 and the second bank BK2 including the second memory cell array MCA2, the first bank BK1 may be disposed on one side of the peripheral circuit MD in the second direction Y, and the second bank BK2 may be disposed on the opposite side thereof. Among the third bank BK3 and the fourth bank BK4 including the first memory cell array MCA1, the third bank BK3 may be disposed on one side of the peripheral circuit MD in the second direction Y, and the fourth bank BK4 may be disposed on the opposite side thereof. For example, the first bank BK1 and the third bank BK3 may be disposed on the same side of the peripheral circuit MD in the second direction Y, and the second bank BK2 and the fourth bank BK4 may be disposed on the opposite side thereof.

In some embodiments, the disposition of the plurality of memory cell arrays MCA of each of the plurality of banks BK1, BK2, BK3, and BK4 may have a symmetrical structure with respect to the peripheral circuit MD. For example, banks facing each other with the peripheral circuit MD interposed therebetween may include memory cell arrays MCA having the same size.

Although FIG. 10 shows two banks including the first memory cell array MCA1 and two banks including the second memory cell array MCA2, some embodiments are not limited thereto. For example, if there are four banks including the first memory cell array MCA1 or the second memory cell array (MCA2), two banks may be disposed on one side of the peripheral circuit MD and two banks may be disposed on the opposite side thereof.

In some embodiments, the processing unit PU may be disposed adjacent to the bank including the second memory cell array MCA2. For example, the first processing unit PU1 may be disposed adjacent to the first bank BK1, and the second processing unit PU2 may be disposed adjacent to the second bank BK2.

In some embodiments, the processing unit PU may be disposed between the peripheral circuit MD and the bank including the second memory cell array MCA2. For example, the first processing unit PU1 may be disposed between the peripheral circuit MD and the first bank BK1 including the second memory cell array MCA2, and the second processing unit PU2 may be disposed between the peripheral circuit MD and the second bank BK2 including the second memory cell array MCA2.

In some embodiments, the semiconductor memory device 20 and the memory controller (10 in FIG. 8) may be connected to each other through one channel, but are not necessarily limited thereto, and may be connected to each other through two channels according to embodiments. For example, the third bank BK3 and the fourth bank BK4 of the semiconductor memory device 20 may be connected to the memory controller (10 in FIG. 8) through the first channel, and the first bank BK1 and the second bank BK2 may be connected to the memory controller (10 in FIG. 8) through the first channel.

For example, the memory controller (10 in FIG. 8) may control the semiconductor memory device 20 in the first mode that performs a general data read/write operation and the second mode that performs computation using a processing unit PU. The semiconductor memory device 20 may use the third bank BK3 and fourth bank BK4 including the first memory cell array MCA1 in the first mode, and may use the first bank BK1 and second bank BK2 including the second memory cell array MCA2 in the second mode. When the first mode and the second mode operate simultaneously in the semiconductor memory device 20, the memory controller (10 in FIG. 8) may access the third bank BK3 and the fourth bank BK4 through the first channel, and access the first bank BK1 and the second bank BK2 through the second channel. The access through the first channel and the access through the second channel may be independently performed.

Some embodiments of FIG. 10 may have the same and/or similar effect as that of some embodiments of FIG. 9. According to some embodiments, the plurality of banks BK1, BK2, BK3, and BK4 include the bank including the first memory cell array MCA1 and the bank including the second memory cell array MCA2, so that the semiconductor memory device 20 may improve artificial neural network computation performance while minimizing or reducing an increase in size.

Hereinafter, a semiconductor memory device and a memory system including the same according to at least one embodiment will be described with reference to FIG. 11 and FIG. 12.

Figure 11:
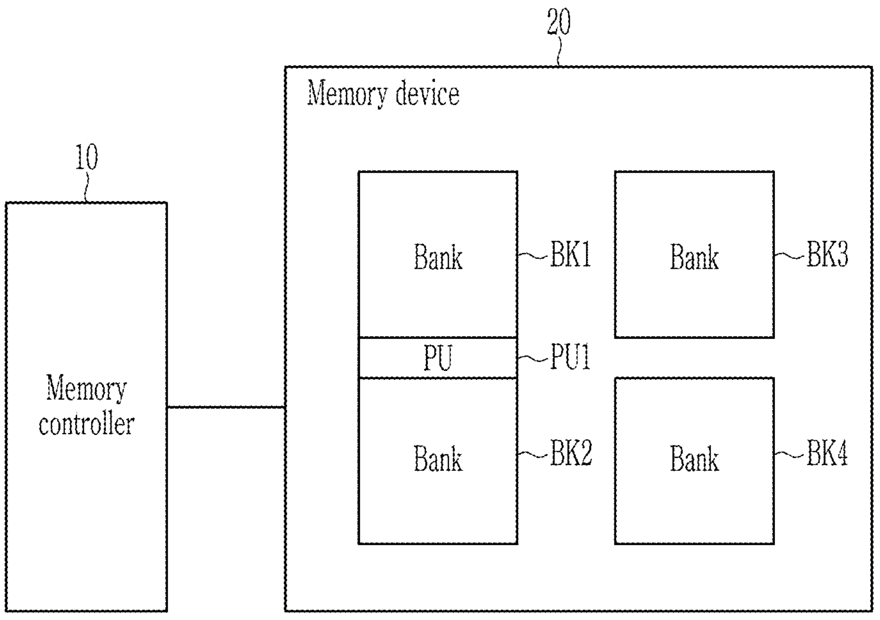
FIG. 11 illustrates a block diagram of a memory system according to at least one embodiment.

FIG. 11 illustrates a block diagram of a memory system according to at least one embodiment. FIG. 12 illustrates a top plan view of a layout of components of a semiconductor memory device according to at least one embodiment. Hereinafter, differences between FIG. 11 to FIG. 12 and FIG. 8 and FIG. 10 will be mainly described, and redundant descriptions will be simplified or omitted.

Referring to FIG. 11, the memory system may include a memory controller 10 and a semiconductor memory device 20. The semiconductor memory device 20 may include a bank and a processing unit PU. The semiconductor memory device 20 may include a plurality of banks BK1, BK2, BK3, and BK4. For example, the plurality of banks BK1, BK2, BK3, and BK4 may include a first bank BK1, a second bank BK2, a third bank BK3, and a fourth bank BK4. The description of the banks described with reference to FIG. 2 may be applied in the same or similar manner to the first bank BK1, the second bank BK2, the third bank BK3, or the fourth bank BK4.

According to some embodiments, the processing unit PU may be connected to at least two banks. For example, the first processing unit PU may be connected to the first bank BK1 and the second bank BK2. Although FIG. 11 illustrates that one processing unit PU is connected to two banks, the present disclosure is not limited thereto. In some embodiments, the number of banks connected to one processing unit PU may be three or more.

Referring to FIG. 2 and FIG. 11 together, the first processing unit PU1 may be connected to the buffer BF of the first bank BK1 and the buffer BF of the second bank BK2. The first processing unit PU1 may perform computations using data stored in the buffer BF of the first bank BK1 and/or data stored in the buffer BF of the second bank BK2.

Figure 12:
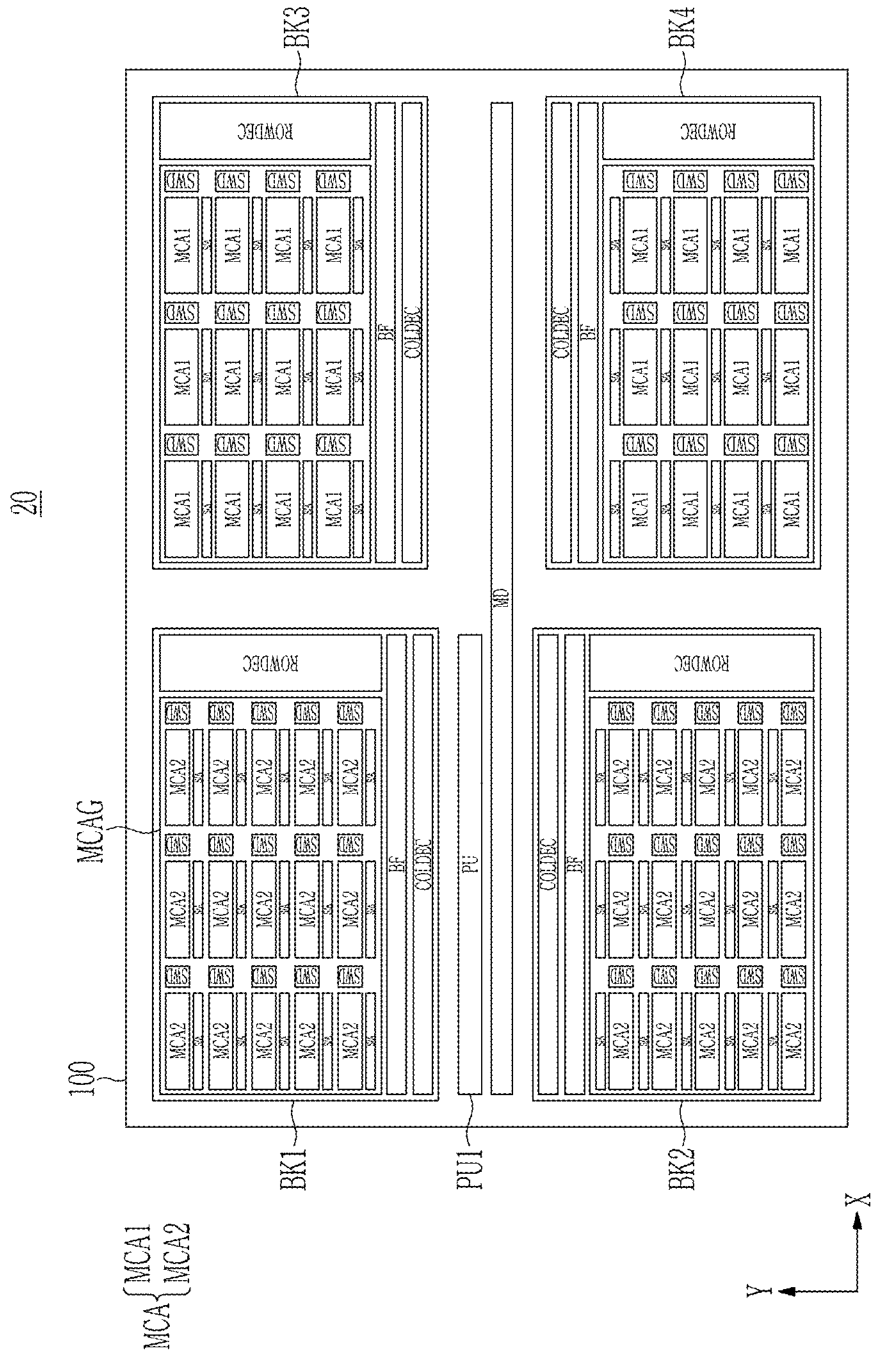
FIG. 12 illustrates a top plan view of a layout of components of a semiconductor memory device according to at least one embodiment.

Referring to FIG. 12, the first bank BK1, the second bank BK2, the third bank BK3, and the fourth bank BK4 may be disposed on the substrate 100. The first bank BK1 and the third bank BK3, and the second bank BK2 and the fourth bank BK4 may be disposed along the first direction X. The first bank BK1 and the second bank BK2, and the third bank BK3 and the fourth bank BK4 may be disposed along the second direction Y that intersects the first direction X. The second direction Y may be, for example, a direction perpendicular to the first direction X.

In some embodiments of FIG. 12, like some embodiments of FIG. 10, the first bank BK1 and the second bank BK2 may include a second memory cell array MCA2, and the third bank BK3 and the fourth bank BK4 may include a first memory cell array MCA1. The second memory cell array MCA2 may have the second size, and the first memory cell array MCA1 may have the first size. The second size may be smaller than the first size.

The peripheral circuit MD may be disposed between the first bank BK1 and the second bank BK2, and between the third bank BK3 and the fourth bank BK4. The peripheral circuit MD may be disposed in an area extending along the first direction X. In some embodiments, a plurality of banks including the first memory cell array MCA1 may be divided and disposed on one side and the opposite side of the peripheral circuit MD. A plurality of banks including the second memory cell array MCA2 may be divided and disposed on one side and the opposite side of the peripheral circuit MD.

For example, among the first bank BK1 and the second bank BK2 including the second memory cell array MCA2, the first bank BK1 may be disposed on one side of the peripheral circuit MD in the second direction Y, and the second bank BK2 may be disposed on the opposite side thereof. Among the third bank BK3 and the fourth bank BK4 including the first memory cell array MCA1, the third bank BK3 may be disposed on one side of the peripheral circuit MD in the second direction Y, and the fourth bank BK4 may be disposed on the opposite side thereof. For example, the first bank BK1 and the third bank BK3 may be disposed on the same side of the peripheral circuit MD in the second direction Y, and the second bank BK2 and the fourth bank BK4 may be disposed on the opposite side thereof.

In some embodiments, the processing unit PU may be disposed adjacent to the bank including the second memory cell array MCA2. For example, the first processing unit PU may be disposed adjacent to the first bank BK1 or the second bank BK2.

According to some embodiments, the processing unit PU may be disposed between one of a plurality of banks that are connected to the processing unit PU and include the second memory cell array MCA2 and the peripheral circuit MD. For example, the first processing unit PU1 may be disposed between one of the first bank BK1 and the second bank BK2 and the peripheral circuit MD. In FIG. 11, an example in which the first processing unit PU1 is disposed between the first bank BK1 and the peripheral circuit MD is shown, but the present disclosure is not limited thereto. As another example, the first processing unit PU1 may be disposed between the second bank BK2 and the peripheral circuit MD.

Although FIG. 11 shows that there are two banks including the second memory cell array MCA2 and the processing unit PU is connected to two banks including the second memory cell array MCA2, some embodiments are not limited thereto. In some embodiments, the semiconductor memory device 20 may further include a fifth bank and a sixth bank including the second memory cell array MCA2, and a second processing unit connected to the fifth bank and the sixth bank. In these cases, the fifth bank and the sixth bank may be divided and disposed on one side and the opposite side of the peripheral circuit MD in the second direction Y, and the second processing unit may be disposed between one of the fifth bank and the sixth bank and the peripheral circuit MD.

Some embodiments of FIG. 11 and FIG. 12 may have the same (or similar) effects as that of some embodiments of FIG. 8 and FIG. 10. According to some embodiments, the plurality of banks BK1, BK2, BK3, and BK4 include the bank including the first memory cell array MCA1 and the bank including the second memory cell array MCA2, so that the semiconductor memory device 20 may improve artificial neural network computation performance while minimizing or reducing an increase in size.

Hereinafter, a semiconductor memory device and a memory system including the same according to at least one embodiment will be described with reference to FIG. 13 to FIG. 15.

Figure 13:
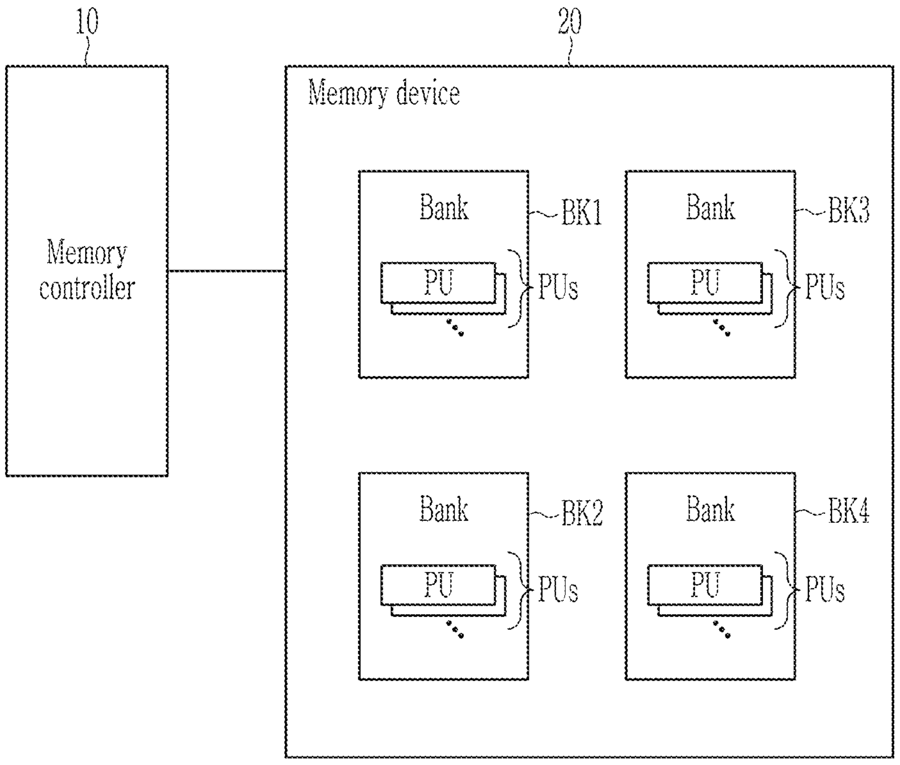
FIG. 13 illustrates a block diagram of a memory system according to at least one embodiment.

FIG. 13 illustrates a block diagram of a memory system according to at least one embodiment. FIG. 14 illustrates a bank of a semiconductor memory device according to at least one embodiment. FIG. 15 illustrates a top plan view of a layout of components of a semiconductor memory device according to at least one embodiment. Hereinafter, differences between FIG. 13 to FIG. 15 and FIG. 1 to FIG. 3 will be mainly described, and redundant descriptions will be simplified or omitted.

Referring to FIG. 13, the memory system may include a memory controller 10 and a semiconductor memory device 20. The semiconductor memory device 20 may include a bank and a processing unit PU. The semiconductor memory device 20 may include a plurality of banks BK1, BK2, BK3, and BK4. For example, the plurality of banks BK1, BK2, BK3, and BK4 may include a first bank BK1, a second bank BK2, a third bank BK3, and a fourth bank BK4.

In some embodiments, the semiconductor memory device 20 may include a plurality of processing units PUs connected to each of the plurality of banks BK1, BK2, BK3, and BK4. For example, the plurality of processing units PUs may be disposed inside each of the plurality of banks BK1, BK2, BK3, and BK4.

Figure 14:
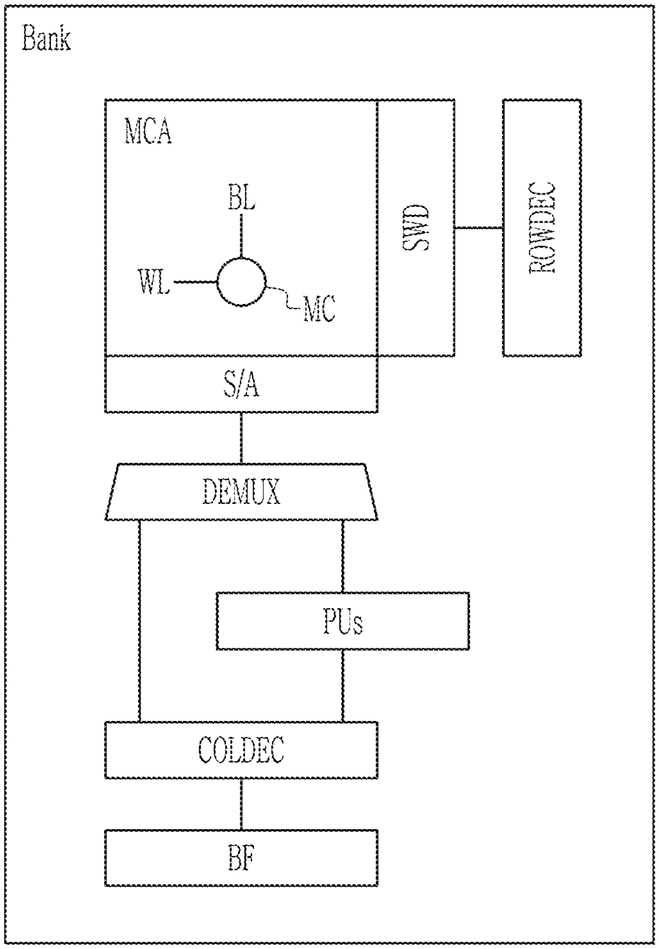
FIG. 14 illustrates a block diagram of a bank of a semiconductor memory device according to at least one embodiment.

Referring to FIG. 14, the bank may include a memory cell array MCA, a sense amplifier S/A, a sub-word line driver SWD, a column decoder COLDEC, a row decoder ROWDEC, a buffer BF, a demultiplexer DEMUX, and a plurality of processing units PUs. The bank of FIG. 14 may be the first bank BK1, the second bank BK2, the third bank BK3, or the fourth bank BK4 of FIG. 13.

The contents described above with reference to FIG. 2 may be equally applied to the memory cell array MCA, the sense amplifier S/A, the sub-word line driver SWD, the column decoder COLDEC, the row decoder ROWDEC, and the buffer BF.

In some embodiments, the demultiplexer DEMUX may be connected between the sense amplifier S/A and the column decoder COLDEC, and between the sense amplifier S/A and the plurality of processing units PUs. The demultiplexer DEMUX may connect the sense amplifier S/A to the column decoder COLDEC or connect it to the plurality of processing units PUs, in response to the mode selection signal received from the memory controller (20 in FIG. 13).

For example, the memory controller (10 in FIG. 13) may be configured to control the semiconductor memory device (20 in FIG. 13) in the first mode that performs the general data read/write operation and the second mode that performs computation using the plurality of processing units PUs. For example, the demultiplexer DEMUX may connect the sense amplifier S/A to the column decoder COLDEC in response to a signal for selecting the first mode, and connect the sense amplifier S/A to the plurality of processing units PUs in response to a signal for selecting the second mode.

In the first mode, the sense amplifier S/A may be configured to sense and amplify a voltage difference between a pair of bit lines connected to the column selected by the column decoder COLDEC. The buffer BF may be configured to store data read from a cell of a row and a column selected by the row decoder ROWDEC and the column decoder COLDEC. In addition, data stored in the buffer BF may be written to the cell of the row and the column selected by the row decoder ROWDEC and the column decoder COLDEC.

In the second mode, data sensed and amplified by the sense amplifier S/A may be provided to the plurality of processing units PUs. The plurality of processing units PUs may be configured to perform a computation using data provided from the sense amplifier S/A. In some embodiments, each of the plurality of processing units PUs may perform computations in parallel.

For example, each processing unit (PU in FIG. 13) may include a logic circuit and a cache memory that are configured to perform computations. The cache memory may be configured to temporarily store data obtained from the sense amplifier S/A and/or data received from the host for the computation of the processing unit (PU in FIG. 13).

In some embodiments, computation results of the plurality of processing units PUs may be provided to the buffer BF. For example, a computation result corresponding to a column selected by the column decoder COLDEC among the computation results of the plurality of processing units PUs may be provided to the buffer BF, but is not necessarily limited thereto. As another example, the computation results of the plurality of processing units PUs may be directly provided to the buffer BF.

Figure 15:
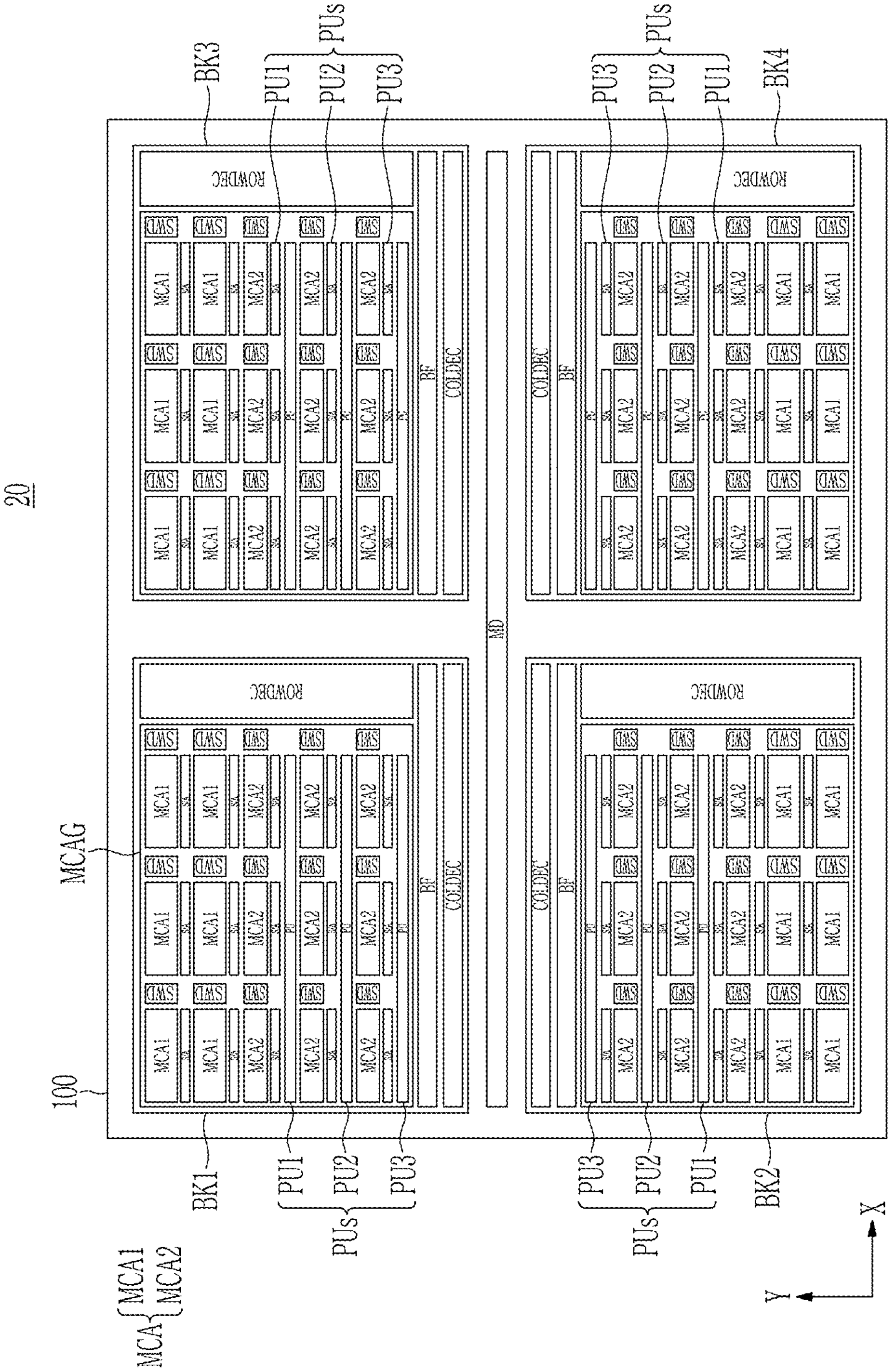
FIG. 15 illustrates a top plan view of a layout of components of a semiconductor memory device according to at least one embodiment.

FIG. 15 may be a top plan view of the semiconductor memory device 20 according to some embodiments shown in FIG. 13. Referring to FIG. 15, the semiconductor memory device 20 may include a substrate 100, a plurality of banks BK1, BK2, BK3, and BK4, a peripheral circuit MD, and a plurality of processing units PUs included in each of the plurality of banks BK1, BK2, BK3, and BK4. In FIG. 15, the demultiplexer DEMUX of the bank shown in FIG. 14 may be omitted.

The plurality of banks BK1, BK2, BK3, and BK4 may be disposed on the substrate 100. For example, the plurality of banks BK1, BK2, BK3, and BK4 may include a first bank BK1, a second bank BK2, a third bank BK3, and a fourth bank BK4. The first bank BK1 and the third bank BK3, and the second bank BK2 and the fourth bank BK4 may be disposed along the first direction X. The first bank BK1 and the second bank BK2, and the third bank BK3 and the fourth bank BK4 may be disposed along the second direction Y. The second direction Y may be, for example, a direction perpendicular to the first direction X.

The peripheral circuit MD may be disposed between the plurality of banks BK1, BK2, BK3, and BK4. Although not shown, each of the plurality of banks BK1, BK2, BK3, and BK4 may be electrically connected to the peripheral circuit MD. The peripheral circuit MD may be disposed between the first bank BK1 and the second bank BK2, and between the third bank BK3 and the fourth bank BK4. The peripheral circuit MD may be disposed in an area extending along the first direction X. The first bank BK1 and the third bank BK3 may be disposed on one side of the peripheral circuit MD in the second direction Y, and the second bank BK2 and the fourth bank BK4 may be disposed on the other side (for example, opposite side) in the second direction Y.

For example, the peripheral circuit MD may include a command/address buffer, a control logic circuit, a data input/output buffer, and/or the like. The command/address buffer may receive a command and an address from the memory controller (10 in FIG. 13). The control logic circuit may be configured to control access to the memory cell array MCA and to control the processing unit PU based on the command and the address received from the memory controller (10 in FIG. 13). The data input/output buffer may be configured to store data received from the host, data read from the memory cell array MCA, and/or results computed by the processing unit PU. The semiconductor memory device 20 may exchange data with the memory controller (10 in FIG. 1) through the data input/output buffer.

In some embodiments, the plurality of processing units PUs may be connected to one bank. The plurality of processing units PUs may be connected to each of a corresponding one of the plurality of banks BK1, BK2, BK3, and BK4. In some embodiments, the plurality of processing units PUs may be disposed inside a bank to which the plurality of processing units PUs are connected. For example, each of the plurality of banks BK1, BK2, BK3, and BK4 may include a subset of the plurality of processing units PUs.

In some embodiments, each of the plurality of banks BK1, BK2, BK3, and BK4 may include a first memory cell array MCA1 having the first size and a second memory cell array MCA2 having the second size smaller than the first size. Hereinafter, the first bank BK1 will be described, but the content described later may be equally applied to the second bank BK2, the third bank BK3, or the fourth bank BK4.

In some embodiments, the first bank BK1 may include a plurality of first memory cell arrays MCA1 and a plurality of second memory cell arrays MCA2. The plurality of first memory cell arrays MCA1 and the plurality of second memory cell arrays MCA2 may be disposed in an array form including a plurality of rows. For example, the first bank BK1 may include first rows configured of the first memory cell array MCA1 and second rows configured of the second memory cell array MCA2.

In some embodiments, the plurality of processing units PUs may be disposed adjacent to the second memory cell array in the first bank BK1. The plurality of processing units PUs disposed in the first bank BK1 may include, for example, a first processing unit PU1, a second processing unit PU2, and a third processing unit PU3. Each of the first processing unit PU1, the second processing unit PU2, and the third processing unit PU3 may be disposed adjacent to each of the second rows configured of the second memory cell array in the first bank BK1.

For example, each of the first processing unit PU1, the second processing unit PU2, and the third processing unit PU3 may be connected to the plurality of sense amplifiers S/A of the plurality of second memory cell arrays MCA2 configuring the second row. Each of the first processing unit PU1, the second processing unit PU2, and the third processing unit PU3 may perform a computation using data read from the plurality of second memory cell arrays MCA2 configuring the second row. The first processing unit PU1, the second processing unit PU2, and the third processing unit PU3 may perform computations on the second rows in parallel.

Although FIG. 15 shows that three processing units PU are disposed in one bank, some embodiments are not limited thereto. For example, fewer or more than three processing units PU may be disposed in one bank. The number of processing units PU disposed in one bank may be variously changed.

In addition, although it has been described above that one processing unit PU performs a computation on one second row, some embodiments are not limited thereto, and one processing unit PU may be configured to perform a computation on a plurality of second rows. In these cases, the processing unit PU may be disposed adjacent to the plurality of second rows.

In some embodiments, the disposition of the plurality of memory cell arrays MCA of each of the plurality of banks BK1, BK2, BK3, and BK4 may have a symmetrical structure with respect to the peripheral circuit MD. For example, in each of the plurality of banks BK1, BK2, BK3, and BK4, the second memory cell array MCA2 may be disposed closer to the peripheral circuit MD than the first memory cell array MCA1.

In some embodiments, the semiconductor memory device 20 may operate in the first mode that performs the general data read/write operation or the second mode that performs the computation using the processing unit PU. The semiconductor memory device 20 may use the first memory cell array MCA1 in the first mode and use the second memory cell array MCA2 in the second mode, but is not limited thereto. For example, the semiconductor memory device 20 may further use the second memory cell array MCA2 as well as the first memory cell array MCA1 in the first mode, or may further use the first memory cell array MCA1 as well as the second memory cell array MCA2 in the second mode.

Some embodiments of FIG. 13 to FIG. 15 may have the same (or similar) effect as that of some embodiments of FIG. 1 to FIG. 3. According to some embodiments, the semiconductor memory device 20 in which each of the plurality of banks BK1, BK2, BK3, and BK4 of the semiconductor memory device 20 includes the first memory cell array MCA1 and the second memory cell array MCA2 may improve artificial neural network computation performance while minimizing or reducing an increase in size.

According to the embodiment of FIG. 1 to FIG. 3, the processing unit PU may sequentially perform computations on the plurality of second rows of each bank. On the other hand, according to some embodiments of FIG. 13 to FIG. 15, each of the plurality of processing units PUs may perform computations in parallel on each of the plurality of second rows of each bank. Accordingly, the computation speed of the semiconductor memory device 20 may be increased.

Hereinafter, a semiconductor memory device according to at least one embodiment will be described with reference to FIG. 16.

Figure 16:
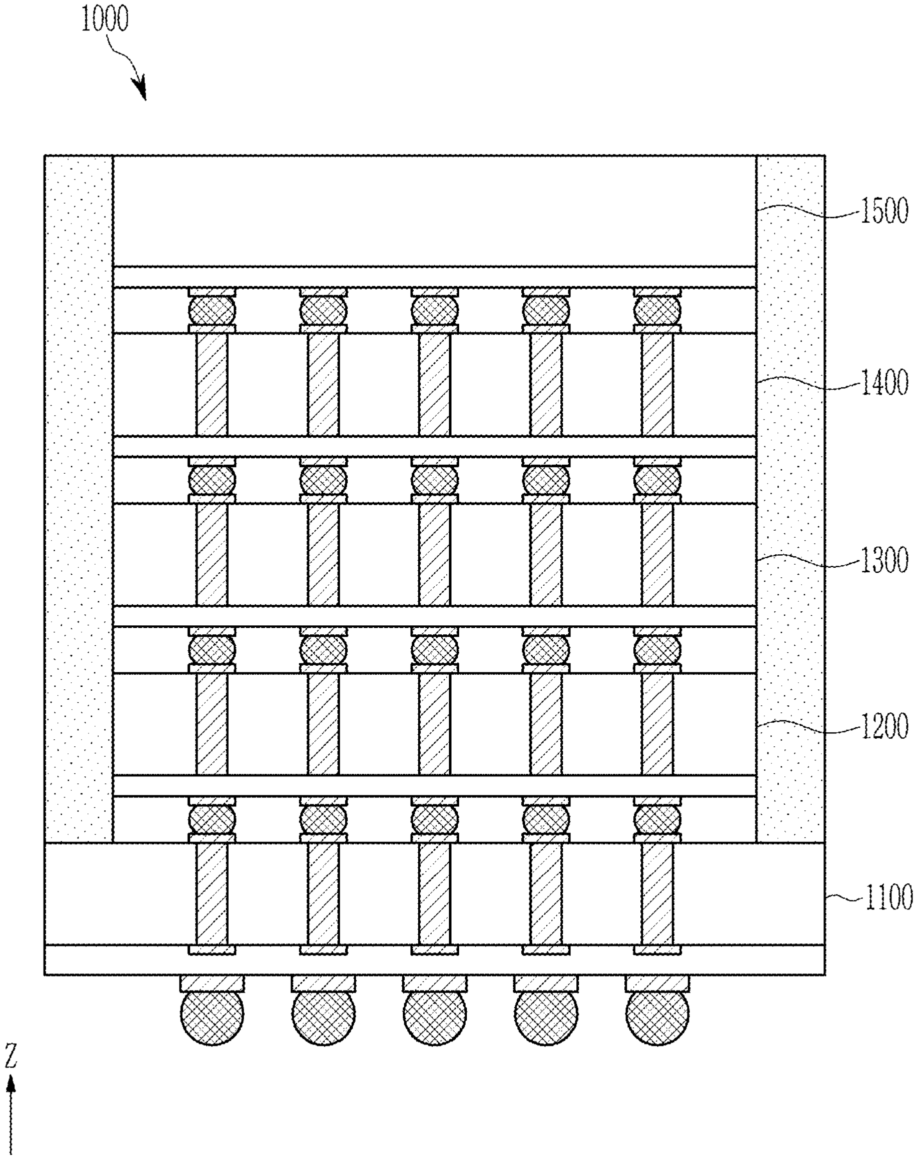
FIG. 16 illustrates a cross-sectional view of a semiconductor memory device according to at least one embodiment.

FIG. 16 illustrates a cross-sectional view of a semiconductor memory device according to at least one embodiment.

Referring to FIG. 16, the semiconductor memory device according to some embodiments may be a high bandwidth memory (HBM) device 1000. The high bandwidth memory device 1000 may include a buffer die 1100 and a plurality of core dies 1200, 1300, 1400, and 1500. For example, the plurality of core dies 1200, 1300, 1400, and 1500 may include a first core die 1200, a second core die 1300, a third core die 1400, and a fourth core die 1500. Although four core dies are shown in FIG. 16, the number of core dies is not limited thereto, and the number of core dies may be variously changed.

The buffer die 1100 and the plurality of core dies 1200, 1300, 1400, and 1500 may be stacked in a third direction Z. The buffer die 1100 may be disposed at the bottom, and the plurality of core dies 1200, 1300, 1400, and 1500 may be stacked on the buffer die 1100 in the third direction Z. For example, the third direction Z may be a direction perpendicular to the first direction X and the second direction Y of the previous drawings.

The buffer die 1100 may be configured to receive a command, an address, and/or data from an external host. The buffer die 1100 and the plurality of core dies 1200, 1300, 1400, and 1500 may be connected through a through silicon via (TSV). The buffer die 1100 may be configured to transmit commands, addresses, and/or data received from the host to the plurality of core dies 1200, 1300, 1400, and 1500 through the TSV.

The buffer die 1100 may additionally include a memory controller according to at least one embodiment. The memory controller according to some embodiments may be one of the memory controllers 10 according to various embodiments described above with reference to FIG. 1 to FIG. 15.

However, some embodiments are not necessarily limited thereto. In some embodiments, the memory controller may be provided as a separate configuration from the high bandwidth memory device 1000. For example, the memory controller may be provided inside the host.

Each of the plurality of core dies 1200, 1300, 1400, and 1500 may be a semiconductor memory device. Each of the plurality of core dies 1200, 1300, 1400, and 1500 may include a plurality of banks and a peripheral circuit. For example, the peripheral circuit may include a control logic circuit and an input/output circuit. The TSV connecting the plurality of core dies 1200, 1300, 1400, and 1500 to each other and connecting the plurality of core dies 1200, 1300, 1400, and 1500 to the buffer die 1100 may be connected to the input/output circuit. The control logic may control to perform operations on the plurality of banks based on commands, addresses, and/or data received through the TSV and the input/output circuit.

At least some of the plurality of core dies 1200, 1300, 1400, and 1500 may be the semiconductor memory device according to the above described embodiments. For example, the semiconductor memory device according to some embodiments may be one of the semiconductor memory devices 20 according to various embodiments described above with reference to FIG. 1 to FIG. 15.

In the semiconductor memory device according to some embodiments, the plurality of banks may include the first memory cell array having the first size and the second memory cell array having the second size smaller than the first size. The semiconductor memory device according to some embodiments may include the processing unit, and the processing unit may be disposed adjacent to the second memory cell array. The semiconductor memory device according to some embodiments may be referred to as a hybrid PIM. Alternatively, a semiconductor memory device in which the plurality of banks include the first memory cell array of the first size and do not include the processing unit may be referred to as a general DRAM.

For example, the first core die 1200 may be a DRAM, and the second core die 1300, the third core die 1400, and the fourth core die 1500 may be hybrid PIMs, but are not necessarily limited thereto. Among the plurality of core dies 1200, 1300, 1400, and 1500, the number of DRAMs, the number of hybrid PIMs, and/or the stacking order of DRAM and hybrid PIMs may be variously changed.

As at least some of the core dies of the high bandwidth memory device 1600 are implemented as the semiconductor memory device 20 according to the above-described embodiment, artificial neural network computation performance may be improved while minimizing or reducing an increase in the size of the high bandwidth memory device 1600.

While some embodiments of the present disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A semiconductor memory device comprising:

a substrate;

a plurality of banks on the substrate, the plurality of banks including (i) a first memory cell array having a first size in a top plan view of the substrate and (ii) a second memory cell array having a second size in the top plan view, the second size being smaller than the first size;

a peripheral circuit disposed between at least two of the plurality of banks in the top plan view; and a processor disposed closer to the second memory cell array than to the first memory cell array in the top plan view.

2. The semiconductor memory device of claim 1, wherein:

a first bank among the plurality of banks includes the first memory cell array and the second memory cell array, and a distance between the second memory cell array and the processor is shorter than a distance between the first memory cell array and the processor.

3. The semiconductor memory device of claim 2, wherein;

the peripheral circuit includes a first peripheral circuit and a second peripheral circuit, and the first peripheral circuit and the second peripheral circuit are spaced apart from each other with the plurality of banks interposed therebetween.

4. The semiconductor memory device of claim 2, wherein:

the processor is included in a plurality of processors, the first bank is included in a plurality of first banks, and each of the plurality of processors is connected to one of the plurality of first banks.

5. The semiconductor memory device of claim 2, wherein;

the processor is included in a plurality of processors, the first bank is included in a plurality of first banks, and each of the plurality of processors is connected to at least two first banks of the plurality of first banks.

6. The semiconductor memory device of claim 5, wherein:

the at least two first banks are divided by the peripheral circuit such that one of the at least two first banks is on a first side of the peripheral circuit and another of the at least two first banks is on a second side of the peripheral circuit opposite to the first side, and each of the plurality of processors connected to the at least two first banks is disposed between one of the at least two first banks and the peripheral circuit.

7. The semiconductor memory device of claim 1, wherein:

the peripheral circuit includes a first peripheral circuit and a second peripheral circuit, at least two first banks among the plurality of banks are divided by the processor such that one of the at least two first banks is on a first side of the processor and another of the at least two first banks is on a second side of the processor opposite to the first side, the first peripheral circuit is between the processor and one of the at least two first banks on the first side of the processor, and the second peripheral circuit is between the processor and another of the at least two first banks on the second side of the processor.

8. The semiconductor memory device of claim 1, wherein:

the first memory cell array is included in a second bank of the plurality of banks, and the second memory cell array is included in a third bank of the plurality of banks, and a distance between the processor and the third bank is shorter than a distance between the processor and the second bank in the top plan view.

9. The semiconductor memory device of claim 8, wherein;

the second bank is on a first side of the peripheral circuit and the third bank is on a second side of the peripheral circuit opposite to the first side, and the processor is between the peripheral circuit and the third bank.

10. The semiconductor memory device of claim 8, wherein;

the plurality of banks include a plurality of second banks and a plurality of third banks, the plurality of second banks are divided and disposed on a first and second side of the peripheral circuit, and the plurality of third banks are divided and disposed on the first and second side of the peripheral circuit.

11. The semiconductor memory device of claim 10, further comprising:

a plurality of processors, wherein each of the plurality of processors is disposed between the peripheral circuit and each of the plurality of third banks.

12. The semiconductor memory device of claim 10, wherein;

the processor is connected to at least two third banks of the plurality of third banks, the at least two third banks are divided and respectively disposed on the first and second side of the peripheral circuit, and the processor is between the peripheral circuit and one of the at least two third banks.

13. The semiconductor memory device of claim 1, wherein:

a fourth bank among the plurality of banks includes the first memory cell array and the second memory cell array, and the processor is adjacent to the second memory cell array within the fourth bank.

14. The semiconductor memory device of claim 13, further comprising:

a plurality of processors connected to the fourth bank, wherein the fourth bank includes first rows corresponding to the first memory cell array and second rows corresponding to the second memory cell array, and each of the plurality of processors is adjacent to the second rows within the fourth bank.

15. A semiconductor memory device comprising:

a substrate;

a plurality of banks on the substrate;

a peripheral circuit between the plurality of banks in a top plan view of the substrate; and a processor adjacent to the peripheral circuit in the top plan view, wherein the plurality of banks include (i) a first memory cell array having a first size in the top plan view and (ii) a second memory cell array having a second size in the top plan view, the second size smaller than the first size, and wherein a distance between the second memory cell array and the processor is shorter than a distance between the first memory cell array and the processor in the top plan view.

16. The semiconductor memory device of claim 15, wherein;

each of the plurality of banks includes the first memory cell array and the second memory cell array, and with respect to each of the plurality of banks, the processor is closer to the second memory cell array than the first memory cell array.

17. The semiconductor memory device of claim 15, wherein:

the plurality of banks include a first bank including the first memory cell array and a second bank including the second memory cell array, and the processor is closer to the second bank than the first bank.

18. The semiconductor memory device of claim 15, wherein:

the plurality of banks include a third bank including a plurality of second memory arrays in an array including a plurality of rows.

19. The semiconductor memory device of claim 18, further comprising:

a plurality of processors inside the third bank, each of the plurality of processors is adjacent to each of the plurality of rows within the third bank.

20. A memory system comprising:

a semiconductor memory device including a substrate, a plurality of banks, and a processor, the plurality of banks including (i) a first memory cell array having a first size in a top plan view of the substrate and (ii) a second memory cell array having a second size in the top plan view, the second size smaller than the first size, and the processor adjacent to the second memory cell array; and a memory controller configured to control an operation of the semiconductor memory device, wherein at least two banks among the plurality of banks are divided by the processor such that one of the at least two banks is on a first side of the processor and another of the at least two banks is on a second side of the processor opposite to the first side in the top plan view.

* * * * *